US008436268B1

(12) United States Patent
Afsari et al.

(10) Patent No.: US 8,436,268 B1
(45) Date of Patent: May 7, 2013

(54) METHOD OF AND APPARATUS FOR TYPE AND COLOR SORTING OF CULLET

(75) Inventors: Farook Afsari, Menlo Park, CA (US); Beejahn Afsari, Folsom, CA (US); Patrick Charles Flynn, Larchmont, NY (US); Dary Kopelioff, Tarzana, CA (US); F. Scott Shook, Whittier, CA (US); Luis Paul Vendrell, Dundee, OR (US)

(73) Assignee: eCullet, Menlo Park, CA (US)

( * ) Notice: Subject to any disclaimer, the term of this patent is extended or adjusted under 35 U.S.C. 154(b) by 1020 days.

(21) Appl. No.: 11/156,229

(22) Filed: Jun. 17, 2005

Related U.S. Application Data

(63) Continuation-in-part of application No. 10/877,531, filed on Jun. 24, 2004, now Pat. No. 7,351,929, and a continuation-in-part of application No. 10/637,188, filed on Aug. 8, 2003, now Pat. No. 7,355, 140.

(60) Provisional application No. 60/493,297, filed on Aug. 6, 2003, provisional application No. 60/403,297, filed on Aug. 12, 2002.

(51) Int. Cl.
*B07C 5/342* (2006.01)
*B07C 5/00* (2006.01)

(52) U.S. Cl.
USPC ............................ 209/581; 209/576; 209/580

(58) Field of Classification Search .................. 209/576, 209/577, 578, 580, 587, 588
See application file for complete search history.

(56) References Cited

U.S. PATENT DOCUMENTS

| | | | |
|---|---|---|---|
| 1,941,212 A | 12/1933 | Johnson | |
| 2,040,503 A | 5/1936 | Saxe | |

(Continued)

FOREIGN PATENT DOCUMENTS

| | | |
|---|---|---|
| DE | 3828067 A1 | 2/1990 |
| EP | 0 426 893 A1 | 11/1989 |

(Continued)

OTHER PUBLICATIONS

Giuseppe Bonifazi, "Classical Imaging and Digital Imaging Spectrophotometric Techniques in Cullets (Glass Fragments) Sorting" University of Rome, Rome, Italy, pp. 264-277, 2004.

*Primary Examiner* — Joseph C Rodriguez
(74) *Attorney, Agent, or Firm* — Haverstock & Owens LLP

(57) ABSTRACT

A system for sorting a mixed stream of colors and types of cullet into separate groups of cullet with similar color and type includes a source for transmitting light through a cullet, and a camera having a plurality of pixels for receiving light transmitted through the cullet or detecting the absence of light blocked by an opaque contaminant, the camera providing at least one value from the light received, wherein the cullet moves along a designated path based in part on the at least one value. The system further includes a radiation source for irradiating a cullet with selected spectral ranges of radiation, and a sensor for determining characteristics of one or more selected spectral ranges of fluorescent radiation emitted by the cullet, wherein the cullet moves along a designated path based in part on the characteristics of the one or more selected spectral ranges of fluorescent radiation. The camera and the sensor collect the received light at desired sampling intervals and a circuit converts the output of the camera and the sensor into digital representation values. The circuit calculates a non-linear function from the digital representation values. An electrostatic or fluid driving actuator directs the cullet along a deflected path based on a value of the non-linear function. A vibratory feeder provides the cullet onto a conveyer belt having an exit roller of a desired diameter.

11 Claims, 16 Drawing Sheets

U.S. PATENT DOCUMENTS

| | | | |
|---|---|---|---|
| 2,297,486 A | 9/1942 | Gerhard | |
| 2,627,975 A | 2/1953 | Ekstrom et al. | 209/111 |
| 3,016,203 A | 1/1962 | Sears | |
| 3,147,321 A | 9/1964 | Oswald | |
| 3,351,198 A | 11/1967 | Wyman et al. | 209/111.6 |
| 3,489,277 A | 1/1970 | Silverman | 209/74 |
| 3,650,396 A | 3/1972 | Gillespie et al. | 209/3 |
| 3,650,400 A * | 3/1972 | Warren et al. | 250/365 |
| 3,802,558 A | 4/1974 | Rhys | 209/75 |
| 3,825,018 A | 7/1974 | Ferraro | |
| 3,897,330 A | 7/1975 | Rhys | 209/75 |
| 3,904,872 A * | 9/1975 | Ebukuro et al. | 250/226 |
| 3,980,180 A | 9/1976 | Jamieson | 209/111.6 |
| 4,076,979 A | 2/1978 | Walter et al. | 250/226 |
| 4,131,540 A | 12/1978 | Husome et al. | 209/582 |
| 4,230,558 A | 10/1980 | Fulwyler | 209/3.1 |
| 4,276,983 A | 7/1981 | Witmer | 209/587 |
| 4,278,538 A | 7/1981 | Lawrence et al. | 209/580 |
| 4,278,995 A | 7/1981 | Fearnside et al. | |
| 4,352,430 A * | 10/1982 | Maier et al. | 209/577 |
| 4,379,525 A | 4/1983 | Nowicki et al. | 241/20 |
| 4,583,695 A | 4/1986 | Genestie | 241/24 |
| 4,584,455 A | 4/1986 | Tomizawa | 219/121 |
| 4,630,736 A | 12/1986 | Maughan et al. | 209/587 |
| 4,642,526 A * | 2/1987 | Hopkins | 315/244 |
| 4,657,144 A | 4/1987 | Martin et al. | 209/546 |
| 4,699,273 A | 10/1987 | Suggi-Liverani et al. | 209/580 |
| 4,699,510 A | 10/1987 | Alguard | 356/73 |
| 4,765,489 A | 8/1988 | Satake | 209/557 |
| 4,863,041 A | 9/1989 | Bailey | 209/580 |
| 4,915,825 A | 4/1990 | Christie et al. | 209/166 |
| 4,919,534 A | 4/1990 | Reed | 356/73 |
| 4,951,825 A | 8/1990 | Hawkins et al. | 209/558 |
| 4,971,684 A | 11/1990 | Mueller | |
| 4,976,356 A | 12/1990 | Mizuno et al. | 209/539 |
| 4,982,557 A | 1/1991 | Gradwohl | |
| 4,991,721 A | 2/1991 | Misra et al. | |
| 5,021,645 A | 6/1991 | Satula et al. | 250/223 |
| 5,025,313 A | 6/1991 | Parulski et al. | |
| 5,062,949 A | 11/1991 | Hausmann | |
| 5,085,325 A | 2/1992 | Jones et al. | 209/580 |
| 5,143,308 A | 9/1992 | Hally et al. | 241/76 |
| 5,148,923 A | 9/1992 | Fraenkel et al. | 209/539 |
| 5,148,993 A | 9/1992 | Kashiwagi | 241/24 |
| 5,150,307 A | 9/1992 | McCourt et al. | 364/478 |
| 5,156,278 A | 10/1992 | Aaron et al. | 209/556 |
| 5,172,005 A | 12/1992 | Cochran et al. | |
| 5,215,772 A | 6/1993 | Roth | 426/231 |
| 5,234,564 A | 8/1993 | Smith | |
| 5,236,596 A | 8/1993 | Greenwald, Sr. | |
| 5,260,576 A * | 11/1993 | Sommer et al. | 250/359.1 |
| 5,314,071 A | 5/1994 | Christian et al. | 209/4 |
| 5,314,072 A | 5/1994 | Frankel et al. | 209/44.1 |
| 5,315,384 A | 5/1994 | Heffington et al. | 348/93 |
| 5,318,172 A | 6/1994 | Kenny et al. | 209/524 |
| 5,333,739 A | 8/1994 | Stelte | 209/582 |
| 5,335,791 A | 8/1994 | Eason | 209/588 |
| 5,339,963 A | 8/1994 | Tao | 209/581 |
| 5,350,118 A | 9/1994 | Mitchell et al. | 239/551 |
| 5,398,818 A | 3/1995 | McGarvey | 209/580 |
| 5,402,264 A | 3/1995 | Wilbur et al. | 359/508 |
| 5,419,438 A | 5/1995 | Squyres et al. | 209/3.1 |
| 5,440,127 A | 8/1995 | Squyres | 250/341.8 |
| 5,443,164 A | 8/1995 | Walsh et al. | 209/580 |
| 5,456,127 A | 10/1995 | Gschweitl | 73/866 |
| 5,464,981 A | 11/1995 | Squyres et al. | 250/341.8 |
| 5,469,973 A | 11/1995 | Booth et al. | 209/580 |
| 5,481,864 A | 1/1996 | Wright | 57/400 |
| 5,483,057 A | 1/1996 | Gross et al. | 250/226 |
| 5,501,344 A | 3/1996 | Kaiser et al. | 209/578 |
| 5,512,758 A | 4/1996 | Kobayashi et al. | 250/461.1 |
| 5,513,805 A | 5/1996 | Fisher et al. | |
| 5,531,331 A | 7/1996 | Barnett | 209/580 |
| 5,533,628 A | 7/1996 | Tao | 209/580 |
| 5,553,714 A * | 9/1996 | Cushman et al. | 209/577 |
| 5,555,984 A * | 9/1996 | Sommer et al. | 209/580 |
| 5,590,791 A | 1/1997 | Gschweitl | 209/577 |
| 5,628,410 A * | 5/1997 | Smith et al. | 209/579 |
| 5,632,381 A | 5/1997 | Thust et al. | 209/44.1 |
| 5,663,997 A * | 9/1997 | Willis et al. | 378/45 |
| 5,675,416 A | 10/1997 | Campbell et al. | 356/367 |
| 5,781,441 A | 7/1998 | Gschweitl | |
| 5,782,364 A | 7/1998 | Macenka | 209/643 |
| 5,788,053 A | 8/1998 | Glawitsch | |
| 5,789,741 A | 8/1998 | Kinter et al. | 250/226 |
| 5,794,788 A | 8/1998 | Massen | 209/524 |
| 5,799,105 A | 8/1998 | Tao | 382/167 |
| 5,813,542 A | 9/1998 | Cohn | 209/581 |
| 5,826,919 A | 10/1998 | Bravo et al. | 285/139.2 |
| 5,848,706 A | 12/1998 | Harris | 209/580 |
| 5,859,712 A | 1/1999 | Kim | |
| 5,862,919 A * | 1/1999 | Eason | 209/577 |
| 5,884,775 A | 3/1999 | Campbell | 209/581 |
| 5,894,938 A * | 4/1999 | Ichise et al. | 209/559 |
| 5,895,910 A | 4/1999 | Christian | 250/208.2 |
| 5,913,427 A | 6/1999 | Gschweitl | 209/10 |
| 5,954,206 A | 9/1999 | Mallon et al. | 209/580 |
| 5,966,217 A | 10/1999 | Roe et al. | 356/402 |
| 5,979,240 A | 11/1999 | Rix et al. | 73/602 |
| 6,011,229 A | 1/2000 | Geisler et al. | 209/127.4 |
| 6,019,248 A | 2/2000 | Steinmayr et al. | |
| 6,080,950 A * | 6/2000 | Jalink | 209/577 |
| 6,112,903 A * | 9/2000 | Kimmel et al. | 209/11 |
| 6,137,074 A * | 10/2000 | Doak | 209/581 |
| 6,138,723 A | 10/2000 | Wagner | |
| 6,144,004 A | 11/2000 | Doak | 209/581 |
| 6,260,712 B1 | 7/2001 | Flottmann et al. | 209/639 |
| 6,265,683 B1 | 7/2001 | Flottmann et al. | 209/576 |
| 6,271,913 B1 * | 8/2001 | Jung et al. | 356/73 |
| 6,313,422 B1 | 11/2001 | Anibus | 209/580 |
| 6,332,540 B1 * | 12/2001 | Paul et al. | 209/3.1 |
| 6,504,124 B1 * | 1/2003 | Doak | 209/581 |
| 6,506,991 B1 | 1/2003 | Eixelberger et al. | 209/581 |
| 6,563,576 B2 | 5/2003 | Gschwitl | |
| 6,603,103 B1 | 8/2003 | Ulrich et al. | |
| 6,603,126 B2 * | 8/2003 | Yamada et al. | 250/372 |
| 6,727,452 B2 * | 4/2004 | Schrader | 209/576 |
| 6,734,383 B1 * | 5/2004 | Calcoen et al. | 209/577 |
| 6,888,917 B2 * | 5/2005 | Sommer et al. | 378/58 |
| 7,114,620 B2 | 10/2006 | Anibas | |
| 7,195,121 B2 | 3/2007 | Anibas | |
| 7,639,352 B2 | 12/2009 | Huber et al. | |
| 7,659,486 B2 * | 2/2010 | Valerio | 209/581 |
| 2002/0079249 A1 * | 6/2002 | Lawandy et al. | 209/3.3 |
| 2003/0094403 A1 * | 5/2003 | Murata et al. | 209/581 |
| 2003/0124217 A1 * | 7/2003 | Schrader | 426/1 |
| 2003/0234210 A1 * | 12/2003 | Deshpande et al. | 209/576 |
| 2004/0035763 A1 | 2/2004 | Kokko et al. | 209/638 |
| 2004/0181302 A1 * | 9/2004 | Schrader | 700/110 |
| 2004/0251177 A1 * | 12/2004 | Lofqvist et al. | 209/577 |
| 2005/0035034 A1 * | 2/2005 | Long et al. | 209/534 |
| 2005/0092658 A1 * | 5/2005 | Bohm et al. | 209/172.5 |
| 2007/0045158 A1 | 3/2007 | Johnson | |
| 2007/0056887 A1 | 3/2007 | Neuhold et al. | |
| 2007/0187305 A1 * | 8/2007 | Valerio | 209/578 |
| 2008/0308471 A1 | 12/2008 | Huber et al. | |

FOREIGN PATENT DOCUMENTS

| | | | |
|---|---|---|---|
| EP | 0 461 616 A2 | 6/1991 | |
| EP | 0 767 709 B1 * | 11/2000 | |
| JP | 59-183340 | 10/1984 | |

\* cited by examiner

METHOD OF AND APPARATUS FOR TYPE AND COLOR SORTING OF CULLET

RELATED APPLICATION

This Patent application is a continuation-in-part of co-pending patent application Ser. No. 10/877,531, filed Jun. 24, 2004 now U.S. Pat. No. 7,351,929 and entitled, "METHOD OF AND APPARATUS FOR HIGH SPEED, HIGH QUALITY CONTAMINANT REMOVAL AND COLOR SORTING OF GLASS CULLET," which (1) claims priority under 35 U.S.C. 119(e) to the co-pending U.S. Provisional Patent Application Ser. No. 60/493,297, filed Aug. 6, 2003, and entitled "GLASS SORTER", which is hereby incorporated by reference and (2) is a continuation-in-part of co-pending patent application Ser. No. 10/637,188, filed Aug. 8, 2003, now U.S. Pat. No. 7,355,140 entitled "METHOD OF AND APPARATUS FOR MULTI-STAGE SORTING OF GLASS CULLETS" which claims priority under 35 U.S.C. 119(e) of the U.S. Provisional patent application Ser. No. 60/403,297 filed Aug. 12, 2002, and entitled "GLASS SORTER", both of which are also hereby incorporated by reference.

LICENSE RIGHTS

THIS INVENTION WAS MADE WITH STATE OF CALIFORNIA SUPPORT UNDER CALIFORNIA DEPARTMENT OF CONSERVATION AGREEMENT NUMBER 5003-505 THE DEPARTMENT HAS CERTAIN RIGHTS TO THIS INVENTION

FIELD OF THE INVENTION

The invention relates to a method and apparatus for sorting glass in general, and specifically, to a method and apparatus for sorting waste glass by type using a unique cullet type identification technique.

BACKGROUND OF THE INVENTION

Currently, there is a need to preserve natural resources and reduce dependence on landfills and similar waste storage facilities. To meet this need, several processes and machines are used to identify and sort waste materials, such as glass. Glass containers and other glass objects are recycled by first crushing or breaking the glass into glass cullet, which are small pieces of glass of varying characteristics that are distinguished by color. Prior to recycling, glass cullet of varying colors and types are placed on a conveyer belt and need to be separated and sorted.

The cullet are then identified and sorted based on the respective color or type of the cullet. For example, a typical collection of glass cullet may include pieces of borosilicate, soda-lime, and flint glass each of which may include clear, red, green and blue color components and combinations as well as contaminants. Prior art glass sorting machines that sort by color function by passing the pieces of cullet (hereinafter referred to as "cullet") in a "waterfall" between colored LED light sources and light sensors arranged to define a sensing area. The cullet have different color characteristics which attenuate the light emitted from the light source in different amounts. For instance, a red colored cullet passed between a series of red and green light sources is identified as a red cullet based on attenuated light characteristics.

U.S. Pat. No. 5,314,071 to Christian et al. teaches a method of purification and color sorting of waste glass as well as a glass beneficiation process and apparatus. Christian et al. teach a method of sorting glass based on the transmission properties of the glass using red and green lamps. In addition, Christian et al. detail a method of using an actuator to deflect the trajectory of the glass. The deflection causes the glass to descend into one of two paths, which is the undeflected trajectory and the deflected trajectory. The specifics of the prior sorting system is taught and described in U.S. Pat. No. 5,314,071 to Christian et. al, which is hereby incorporated by reference.

As full scale glass beneficiation has become more prevalent, the disadvantages of the system and method taught in Christian et al. have been realized. First, the red and green lamps taught in Christian et al. limit the spectral response of the system. Glass entering the beneficiation plants contains shades of green, brown or blue that cannot be differentiated with a red and green lamp. A second disadvantage by the system taught in Christian et al., is that Christian et al. describe a means to deflect the trajectory of the descending glass with a single actuator, which is termed a binary sort. Therefore, the single actuator in Christian et al. performs several sorting stages to arrive at a pure material. Additional sorting stages add cost, energy and time to the equipment and sorting process. A third disadvantage of the system taught in Christian is its inability to distinguish between different glass types.

Other prior art machines sort by type use x-ray fluorescence to produce a x-ray fluorescence spectrum from cullet of unknown composition. By comparing the x-ray fluorescence spectrum with x-ray fluorescence spectra of known materials, the sorting machines classify the unknown cullet as one of several possible materials.

U.S. Pat. No. 6,888,917 to Sommer, Jr. et al. describes a system and process for classifying a piece of material using a high intensity x-ray source. Material moves along a conveyer belt and through a detection chamber where it is exposed to x-rays. The x-rays cause the material to fluoresce and produce an x-ray fluorescence spectrum, which is detected and used to classify the material. Then material moves along a conveyer belt through a series of decision points. At a decision point corresponding to its classification, the material is selectively removed from the conveyer belt by an actuator.

As full scale glass beneficiation has become more prevalent, the disadvantages of the system and method taught in Sommer, Jr. et al. have been realized. The system taught by Sommer uses an x-ray source, which requires high power and produces dangerous radiation, necessitating safety precautions. A second disadvantage of the system taught in Sommer is its use of a single actuator to accomplish a binary sort at each decision point; multiple decision points are sequenced to provide several sorting operations. The sequential nature of the sort requires more time and a larger conveyer belt surface than a system which accomplishes a more complex sort at each decision point. Additional decision points add cost, energy and time to the equipment and sorting process. A third disadvantage of the system taught in Sommer is its inability to distinguish between different glass colors.

In addition, the current actuators are air driven jets which shoot air at the cullet to deflect the cullet into their desired trajectories. However, small cullet having a dimension of less than 0.25 inches are unable to be properly sorted with air jets actuators due to the delay associated with air jet actuators. The valve within the air jet actuator is designed to require 3 to 5 milliseconds of pressure buildup before the actuator is able to discharge the adequate amount of forced air at the cullet. In addition, the compressibility characteristics of air prevents the actuator from quickly discharging and directing the compressed air to the falling cullet. Thus, the design and characteristics of air driven actuators cause the devices and the system in general to be relatively slow and inefficient.

SUMMARY OF THE INVENTION

In one aspect, the present invention relates to a system for sorting a mixed stream of glass cullet into separate groups distinguished by type, comprising at least one light emitting source for transmitting light of predetermined frequency through the glass cullet, at least one camera having a plurality of pixels for receiving light transmitted through the glass cullet, the camera providing at least one value from the light received from at least one of the plurality of pixels, at least one radiation-emitting source for irradiating the glass cullet, causing the glass cullet to fluoresce and emit a spectrum of radiation, and at least one sensor configured to receive one or more selected spectral ranges of the spectrum of radiation emitted from the glass cullet, wherein the glass cullet is moved along a designated path based on characteristics of the one or more selected spectral ranges and the at least one value.

In preferable aspects, the present invention includes a first circuit for converting the at least one value into a digital representation value and a second circuit for converting the one or more selected spectral ranges into an array of digital spectral values. Further, the first circuit preferably calculates a non-linear function from at least one digital representation value. An actuator is also preferably included and configured to direct the cullet along in a selected direction based on a value of the non-linear function. Actuators contemplated within the present invention include an air jet, an electrostatic actuator, and an incompressible fluid jet.

Similarly, the second circuit can calculate a non-linear function from digital spectral values in the array of digital spectral values, and an additional actuator can be included for directing the cullet in a selected direction based on a value of the non-linear function.

The system also preferably includes conveyer belt for transporting cullet to a light sensing region, the conveyer belt coupled to a rotating mechanism for driving the conveyer belt at a desired speed and a feeding mechanism configured to deliver a constant flow of cullet to the conveyer belt.

Preferable light emitting sources include white light sources. However, the light source can include one or more of a red light emitting diode, a green light emitting diode, a blue light emitting diode and an infrared light source.

In the preferred embodiment a UV source is the radiation emitting source. Further, the radiation emitting source preferably includes one or more filters configured to transmit only one or more selected wavelengths of light. The sensor is preferably a charge coupled device coupled with a filter that transmits only the one or more selected spectral ranges of the spectrum of radiation emitted from the glass cullet. In another aspect, the sensor can be a fluorometer that can detect the fluorescence of a material. In another aspect, the sensor is configured to receive a broad spectral range of the spectrum of radiation emitted from the glass cullet and the system further comprises a processing module configured to select one or more narrower spectral ranges from the broad spectral range received by the sensor. The processing module can use any type of electronic filters to select the one or more narrower spectral ranges, including a hardware filter, a software filter, and a combination hardware/software filter.

In an additional aspect, the present invention relates to a method of effectively sorting a group of objects of several types and colors into separate groups of similar type and color objects. The method includes steps of irradiating at least one object with one or more preselected wavelengths of radiation to cause the object to fluoresce and emit a spectrum of radiation in a type sensing region, determining at least one spectral intensity value from the spectrum of radiation, calculating a type value from the spectral intensity value, transmitting at least one light through the at least one object in a color sensing region, determining at least one light intensity value from the transmitted light in the color sensing region, and calculating a color value from the light intensity value. Preferably, both the type sensing region and the color sensing region are substantially shielded from any ambient light that could compromise the type or color determination.

The method can comprise additional optional steps, such as directing the at least one object to a path corresponding with the color value and the type value, which preferably deposits at least one object into a corresponding chamber. Another optional step is providing the at least one object to the color sensing region and subsequently to the type sensing region. Still another is providing the at least one object to the type sensing region and subsequently to the color sensing region.

Further optional steps include the following: receiving the light transmitted through the at least one object, analyzing the received light at a desired sampling interval, converting the at least one light intensity value into a digital representation value, and calculating a non-linear function from at least one digital representation value.

In yet another aspect, the present invention relates to a system for sorting a mixed stream of objects with different colors and types into separate groups of same colored objects. The system comprises a sorting device further comprising: at least one light emitting source for transmitting at least one light of predetermined frequency through at least one object, and at least one camera having a plurality of pixels for receiving light transmitted through the at least one object, the camera providing at least one value from the light received from at least one of the plurality of pixels, wherein the at least one object is directed along at least one designated output path selected from a first plurality of output paths based on the at least one value. The system also includes at least one subsequent sorting device for receiving the at least one object from the at least one designated output path, further comprising: at least one radiation emitting source for irradiating the at least one object to cause the at least one object to fluoresce and emit a spectrum of radiation, at least one sensor configured to receive at least one selected spectral line from the spectrum of radiation, and at least one circuit configured to determine an intensity of the at least one spectral line, wherein the at least one object is directed along at least one additional designated output path selected from a second plurality of output paths based on the intensity of the at least one spectral line.

Preferably, the system further comprises at least one subsequent sorting device that sorts the at least one object in the additional designated output path into a selected one of a plurality of sorted output feeds. Also, the system can include a final sorting device, wherein the final sorting device sorts one or more subsequent input feeds into a plurality of final output feeds. Preferably, the final sorting device directs each of the plurality of final output feeds into a plurality of corresponding storage bins.

Preferably, a system in accordance with the present invention designates at least one of the first plurality of output paths for objects of a desired color. Further, preferably at least one of the first plurality of output paths and one of the second plurality of output paths are designated for undesired objects, wherein the undesired objects are directed to a rejection bin. Also, at least one of the first plurality of output paths is preferably designated for clear objects.

Systems and methods in accordance with the present invention are preferably configured for sorting glass cullet. Further, these systems preferably can separate borosilicate glass, soda-lime glass, and other glass from one another. In addition, the systems according to the present invention preferably can separate a plurality of different colors of glass from one another.

In still another aspect, the present invention relates to a multi-level sorting system for separating different colored and typed cullet into cullet having substantially similar color and type characteristics comprising means for transmitting at least one light through at least one cullet in a color sensing region, means for determining at least one light intensity value from the transmitted light in the color sensing region, means for calculating a color value from the at least one light intensity value, means for irradiating the at least one cullet to cause the at least one cullet to fluoresce and emit a spectrum of radiation in a type sensing region, means for determining at least one spectral line intensity from the spectrum of radiation in the type sensing region, means for calculating a type value from the at least one spectral line intensity, and means for directing the at least one cullet to a desired path based on the color value and the type value.

DETAILED DESCRIPTION OF THE PRESENT INVENTION

The present invention relates to a sorting system that accomplishes sorting of objects based on at least two criteria. Preferably, the sorting system incorporates two or more apparatus configured to sort objects based on at least one criterion. The apparatus comprising the system preferably are configured to sort an input stream of objects into multiple output streams.

Figure 1A:
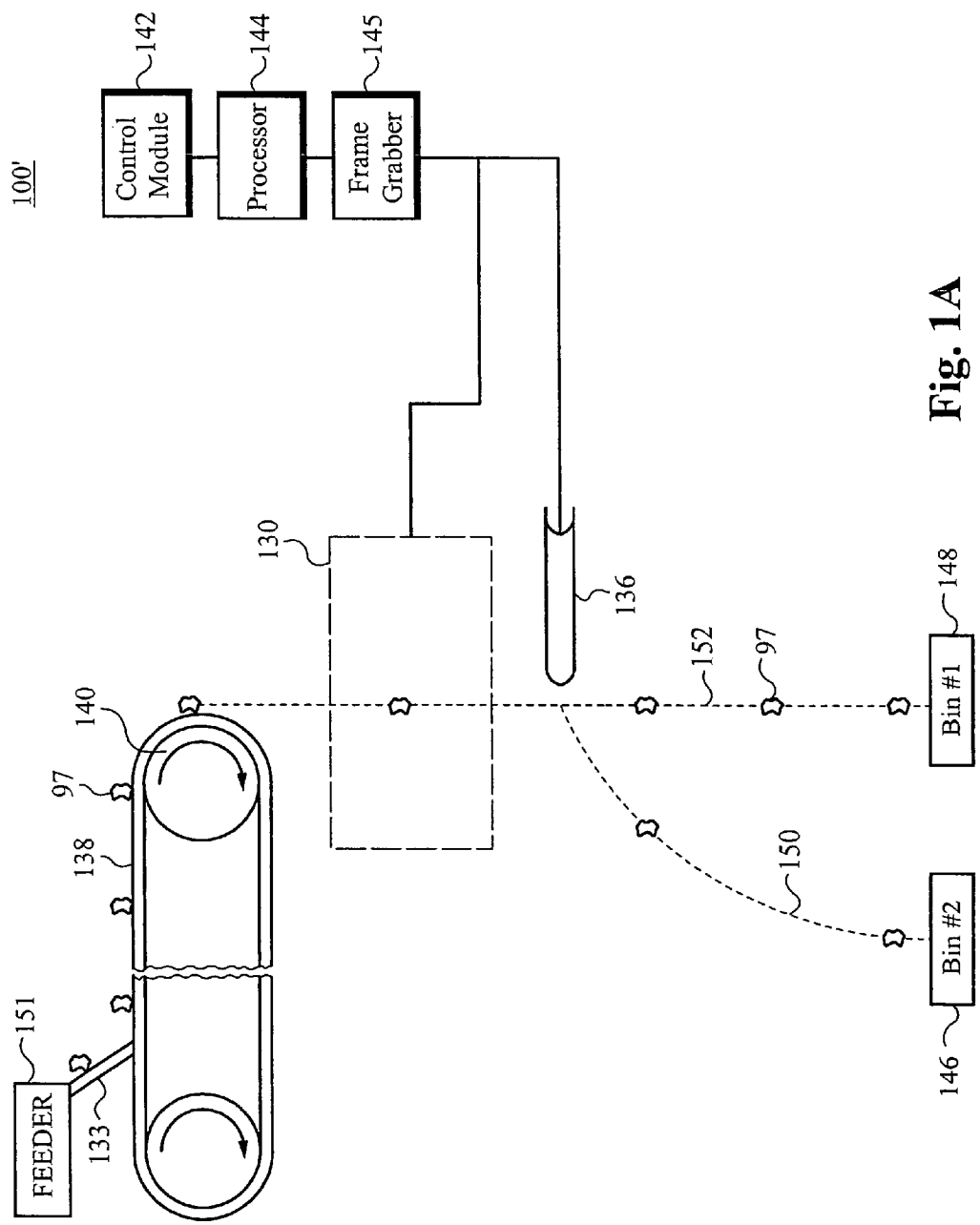
FIG. 1A illustrates a schematic of a sorting mechanism in accordance with the present invention.
Figure 1B:
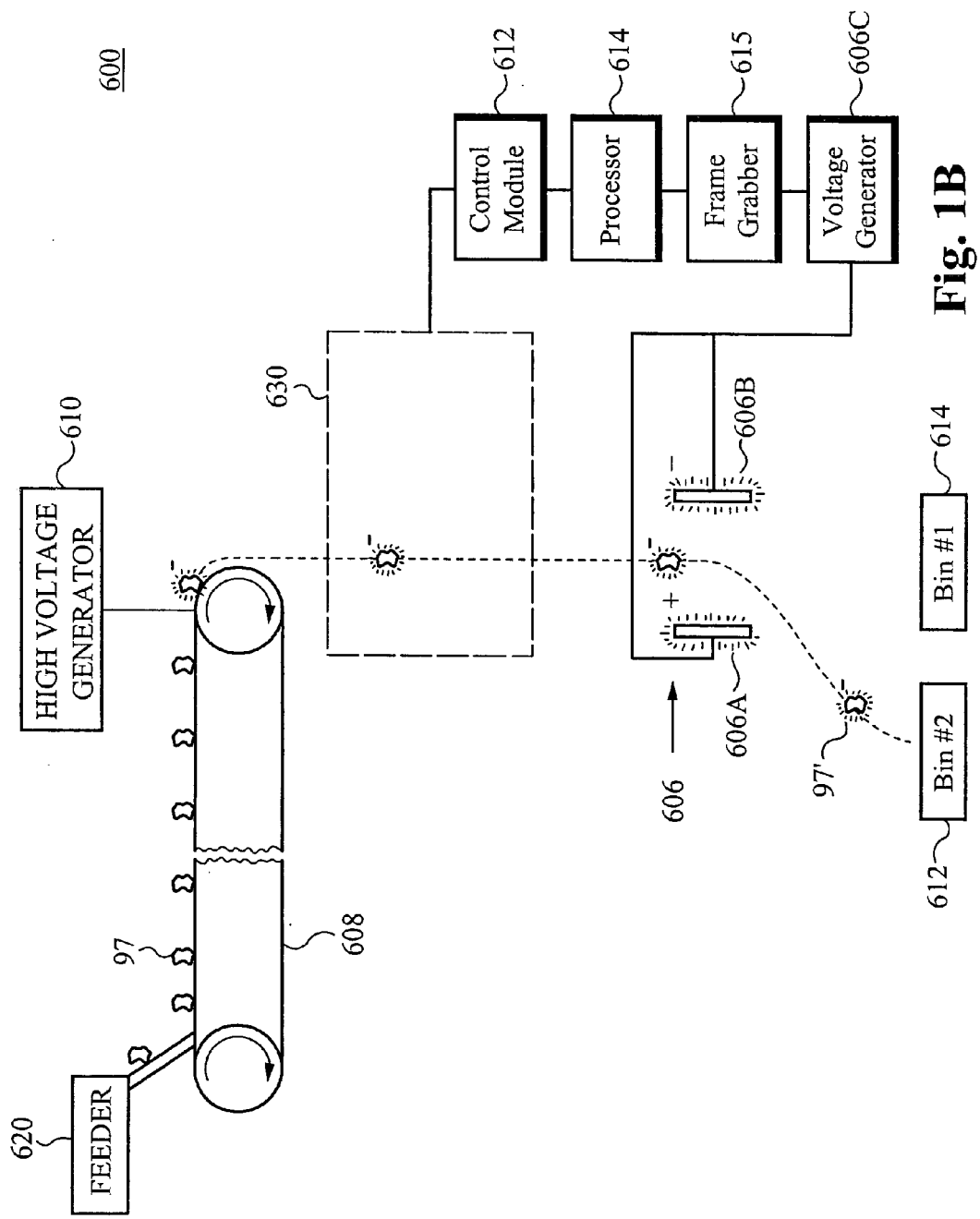
FIG. 1B illustrates a schematic of a sorting mechanism including an actuating device consistent with one embodiment of the present invention.

A system embodying the present invention preferably includes at least one sorting apparatus, such as the exemplary sorting apparatus 100' shown in FIG. 1A. As shown in FIG. 1A, the sorting apparatus 100' preferably includes at least one sensing region 130, through which the initial or sensing path of the cullet 97 passes. A control module 142 is coupled to a sensor module (not shown) and the actuator 136. In addition, a computer or other processing module 144 is coupled to the control module 142, the sensor module and the actuator 136. In one embodiment, the control module 142 and the processing module 144 are integrated into one component. Preferably, the sensing region 130 is substantially shielded from any ambient light that could compromise the type or color determination.

Figure 2A:
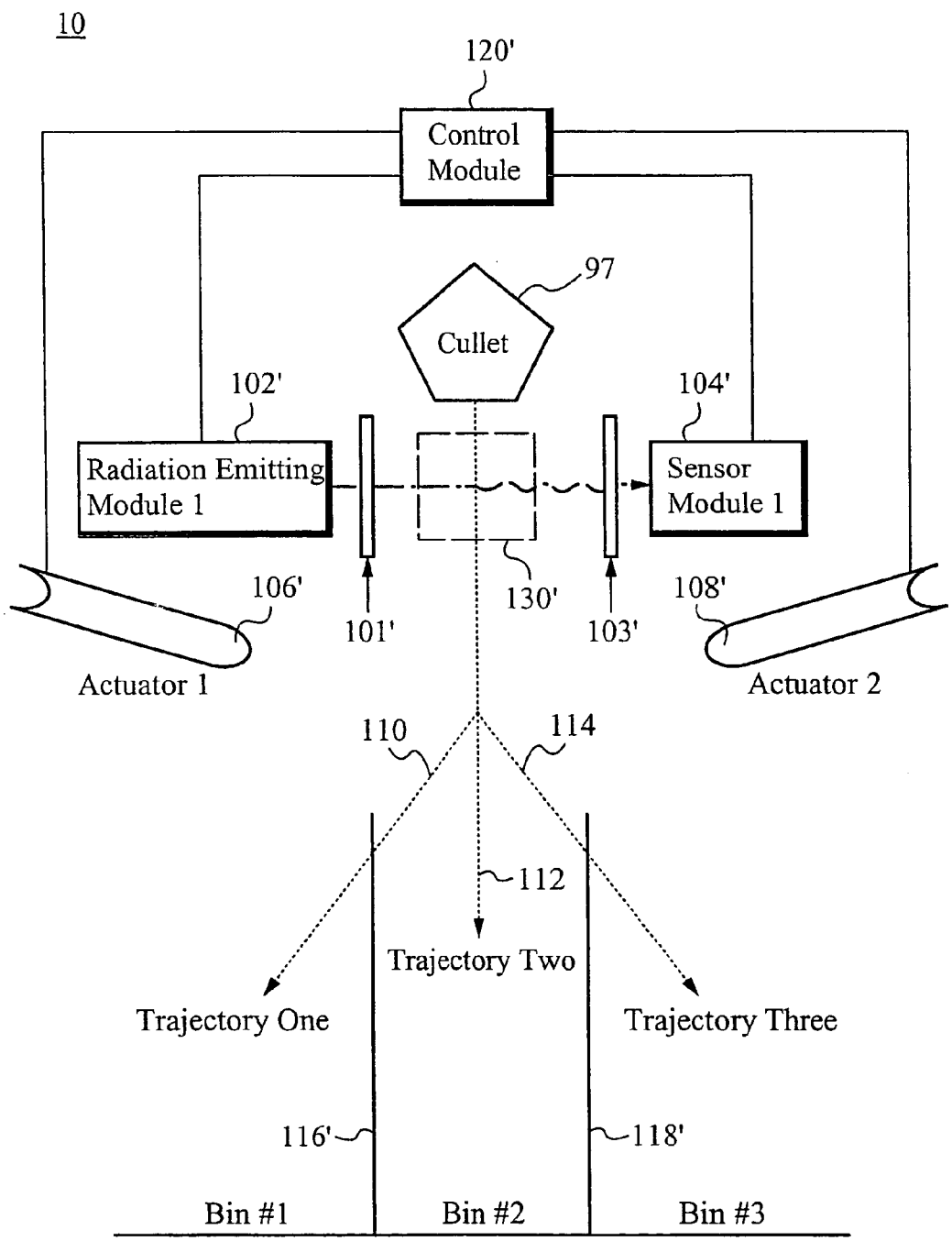
FIG. 2A illustrates an actuator configuration according to one embodiment of the present invention.
Figure 3A:
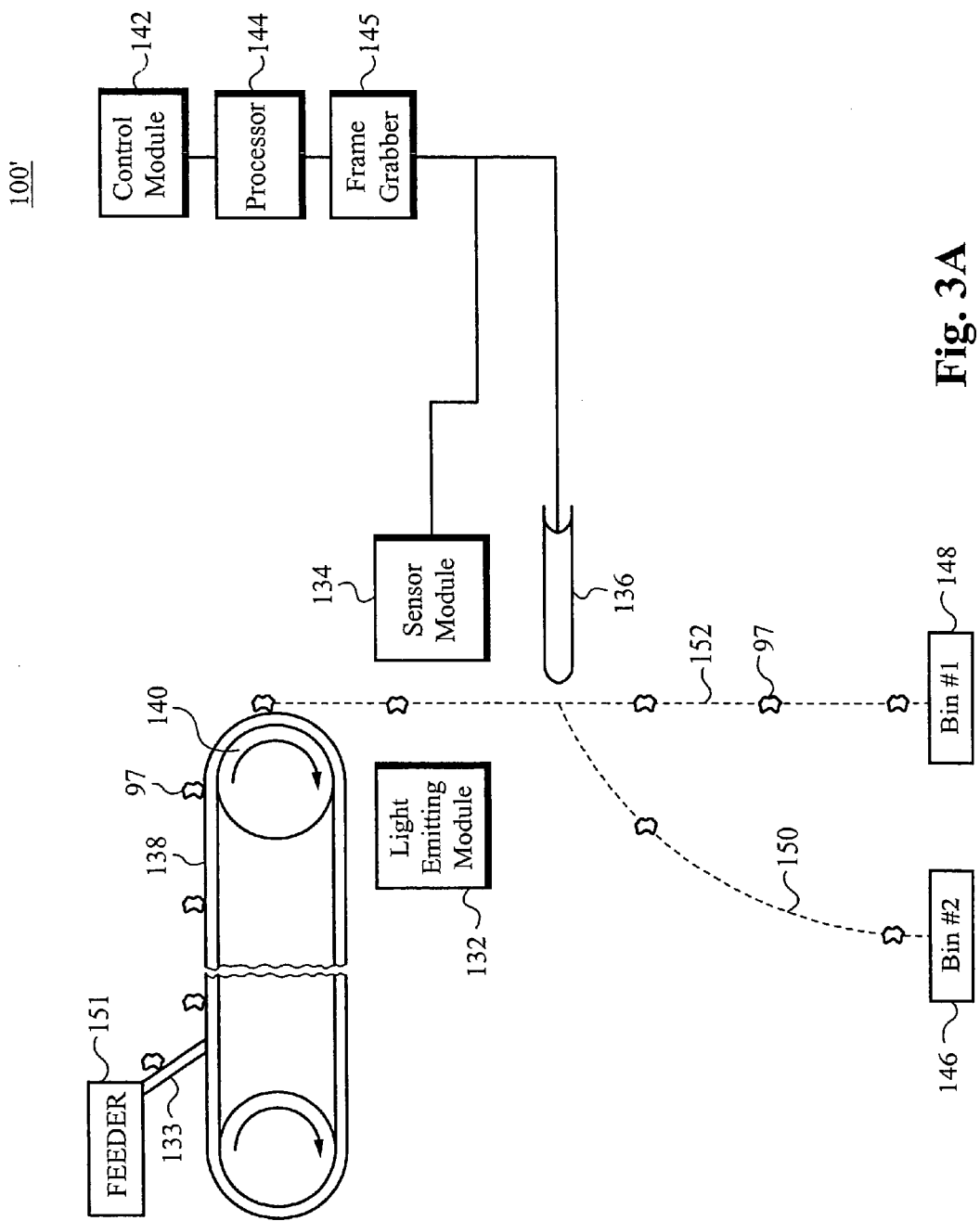
FIG. 3A illustrates a schematic of an alternative embodiment of the sorting mechanism in accordance with the present invention.

The actuator 136 manipulates the path of the falling cullet 97 into a particular collection bin. The particular trajectory path that the cullet is directed along is determined by properties of the cullet 97 that are sensed within the sensing region 130. As shown in FIG. 1A, the actuator 136 directs the cullet 97 in either of two trajectory paths 150, 152, whereby the trajectory path 152 directs the cullet 97 into a first collection bin 148, and the trajectory path 150 directs the cullet 97 into a second collection bin 146. The actuator 136 is positioned near the conveyer belt 138 and under the light sensing region as shown in FIG. 3A. The area which the cullet 97 falls through substantially in front of the actuator 136 is the actuating region or zone. Alternatively, as shown in FIG. 2A, a sorting module 10 includes a first actuator 106' and a second actuator 108' which are positioned opposite of one another on either side of the sensing path. The first actuator 106' and the second actuator 108' direct the cullet 97 along one of the three trajectory paths. The trajectory paths lead the cullet 97 into separate bins which are separated by mechanical separators 116', 118'. The actuators within the present invention are controlled in response to input from the sensing region 130.

The sorting system of the present invention has a number of component subsystems that work in conjunction with one another to effectively sort and filter the array of mixed cullet into the desired bins, whereby each bin collects the substantially same type and/or color cullet. It is apparent to one skilled in the art that the preprocessing and preparation stages are incorporated into the present system. The preprocessing and preparation stages preferably include a glass crushing operation, a glass washing operation, a sifting operation and a sorting preparation. A sifter (not shown) preferably removes the small undesirable shards of glass from the cullet that are to be sorted. The details of the sifter (not shown) are well known in the art and are not discussed in detail herein.

As illustrated in FIG. 1A, a vibratory feeder 151 feeds the cullet 97 onto a conveyer belt 138 via an exit chute 133, whereby the conveyer belt 138 delivers the cullet 97 to the area to be sorted. The vibratory feeder 151 delivers a constant flow of cullet to the sorting system 100', such that the total weight of cullet 97 on the conveyer belt 138 is constant at any given time. The entrance to the exit chute 133 is preferably narrow compared to the width of the conveyer belt 138 to allow the cullet 97 to be spread out laterally as well as longitudinally over the belt 138.

The conveyer belt 138 has an appropriate belt speed to accommodate efficient processing of the cullet 97. However, the speed of the conveyer belt 138 ensures that a cullet waterfall 97 passes through the light sensing region and actuating regions at a given time. Preferably, the conveyor belt 138 is moved at a speed of 40 inches per second. As the speed is increased, the available time to make a color decision is decreased. The cullet packing density on the conveyor belt, the belt speed and width are the primary factors determining the throughput of the system. For a range of particular sizes, processor capability, actuator speed, and sorter geometry, there is a satisfactory range of belt speeds. The optimum belt speed is calculated from this range. Within the system of the present invention, the conveyor belt 138 can be moved at speeds in the range of 1 to 70 inches per second.

In addition, the conveyer belt 138 preferably includes a roller 140 at the end proximal to the light sensing region, whereby the roller 140 has a diameter smaller than existing rollers. Preferably, the diameter of the roller 140 is the same size as the size of the smallest expected cullet. In this manner, all sizes of particles will achieve approximately the same trajectory and velocity, and the difference will be more insensitive to belt speed. Alternatively, a roller 140 of any other appropriate diameter is utilized within the conveyor belt 138. With large diameter rollers, the cullet 97 remains in contact with the belt and experiences movement in the clockwise direction of the roller as the cullet 97 approaches the light sensing region. In particular, as the cullet 97 approaches the light sensing region, the cullet 97 moves laterally and vertically due to being in contact with a larger roller. Therefore, the velocity vector of the cullet 97 includes a substantial horizontal vector component which manipulates the cullet 97 along an undesired trajectory. In contrast, the roller 140 within the diameter range specified above, prevents the cullet 97 from following the surface of the roller 140 as the cullet 97 begins to fall toward the light sensing region. Therefore, the preferred roller 140 causes the cullet 97 to easily separate from the conveyer belt 138 as the cullet 97 reaches the end of the belt 138 and falls toward the light sensing region. In addition, the smaller diameter roller 140 allows large and small cullet to follow the same waterfall trajectory, and the color of the glass can be detected closer to the conveyor belt 138. This closer distance allows precise control and less deviation of the velocity and position of the cullet 97 as the cullet 97 falls along the trajectory path.

Upon reaching the end of the conveyer belt 138, the cullet 97 falls along the waterfall path through the sensing region 130. The present invention preferably includes a system comprising multiple apparatus similar to the apparatus 100' or the apparatus 100. These apparatus can include a variety of different types of sensing devices within their sensing regions 130. For example, sensors to determine the color of an object can be included in one portion of the system, while sensors to determine the material of which an object is composed can be included in another portion. Sensing devices used within the present invention typically include excitation devices and sensing devices. For example, a color sensing device can include a light and a plurality of sensors to receive light transmitted through the object. Preferably, both the type sensing region and the color sensing region are substantially shielded from any ambient light that could compromise the type or color determination.

Figure 2B:
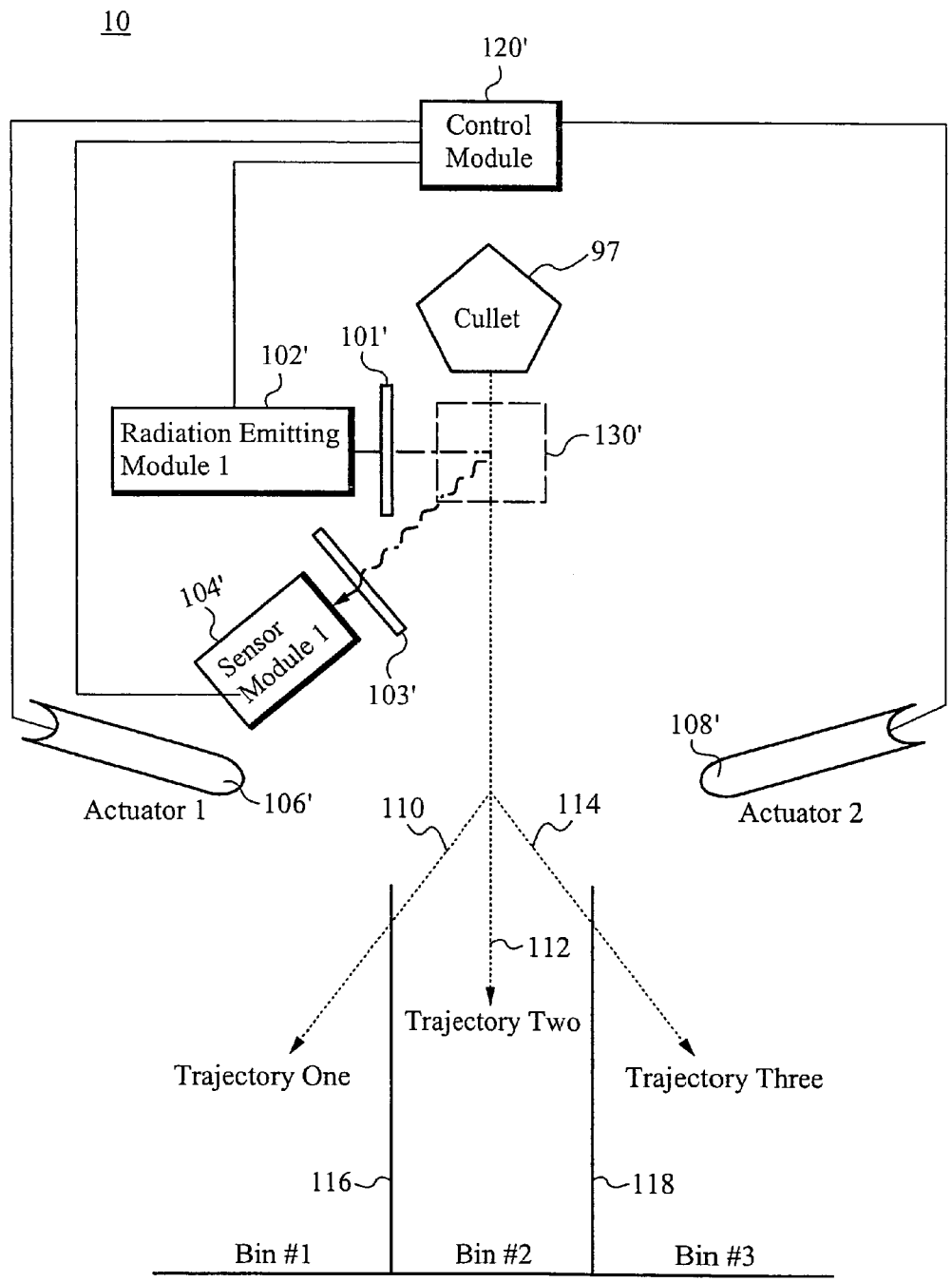
FIG. 2B illustrates an actuator configuration according to one aspect of the preferred embodiment of the present invention.
Figure 2C:
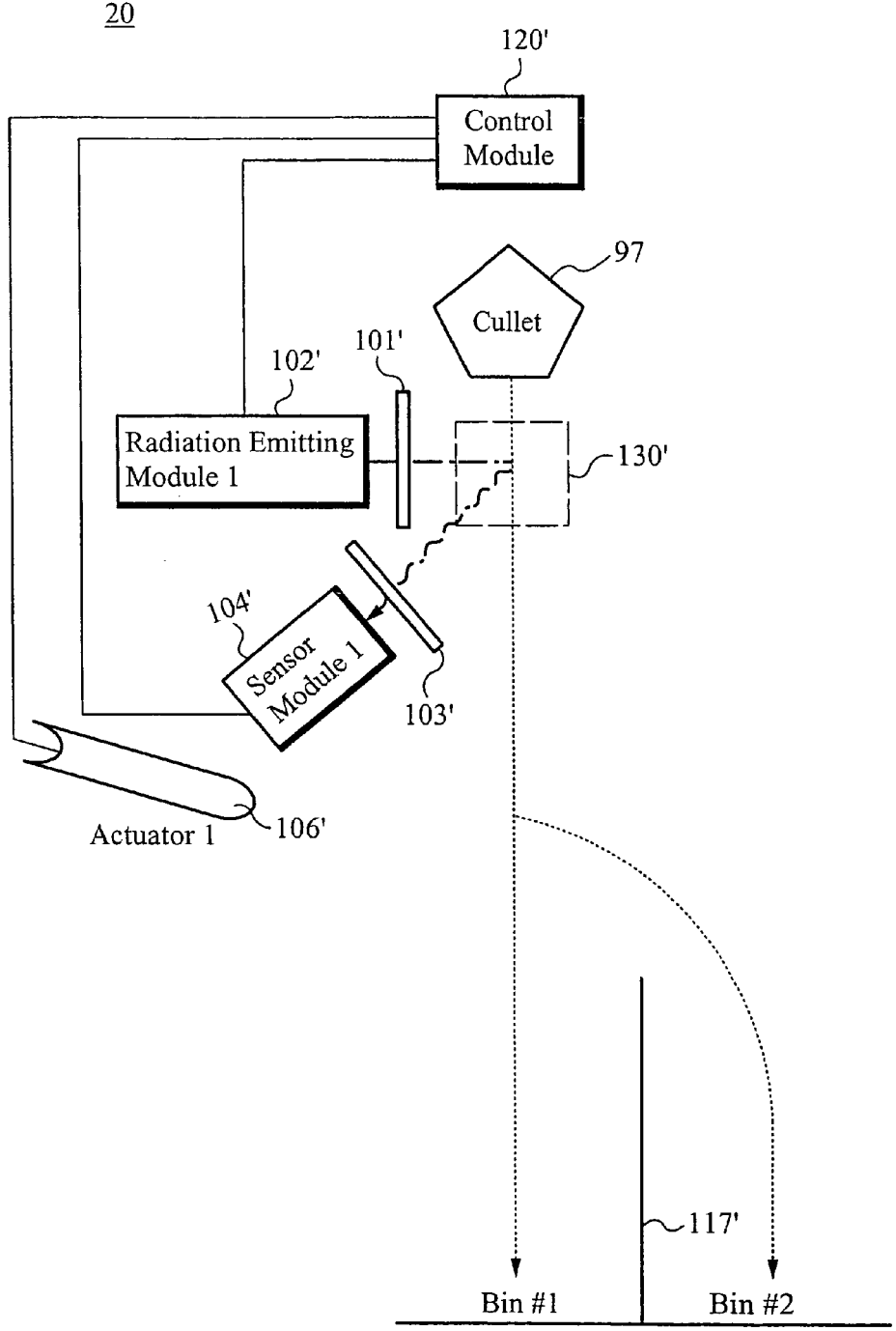
FIG. 2C illustrates an actuator configuration according to an additional embodiment of the present invention.

FIG. 2C shows a material type sensing apparatus 20 of a sorting system in accordance with the present invention. In the apparatus 20, the cullet 97 travels through the type sensing region 130'. The radiation emitting module 102' generates radiation and supplies it through the filter 101' to the sensing region 130'. The sensor module 104' is configured to receive radiation from the sensing region 130' through the filter 103'. As shown, the sensor module 104' is indirectly oriented relative to the radiation emitting module 102' so it receives substantially no radiation directly from the radiation emitting module 102'. The control module 120' controls the radiation emitting module 102' and the sensor module 104', as well as the actuator 106'. Further, the control module 120' receives input from the sensor module 104' and uses that input to determine control instructions for the actuator 106'. The instructions to the actuator 106' cause the actuator 106' to deflect selected objects into the bin number 2, and to let other objects travel into bin number 1.

The radiation emitting module 102' is preferably a UV source which is constantly on when the system is running. The radiation emitting module 102' is preferably coupled to the system power source such that when the system power source is turned on, the radiation emitting module 102' is turned on. Alternatively, the radiation emitting module 102' includes any number of radiation sources, such as an incandescent UV lamp, an LED or a fiber optic radiation delivery system, which emit any desired spectral range of radiation. It is contemplated that the radiation emitting module 102' is capable of emitting radiation continuously, sequentially and/or in regular intervals.

The preferred radiation emitting module uniformly emits all frequency wavelengths in the spectral ranges of interest. However, the optionally included filter 101' restricts the radiation traveling through the sensing region 130' to only selected spectral ranges. In the preferred apparatus, the radiation emitting module is a UV lamp that emits uniform radiation in at least the UV spectrum. The radiation from the UV lamp is filtered so that the radiation entering the sensing region includes only selected spectral ranges. For example, the filtering can be done by bandpass or, more preferably, narrow bandpass optical filters. Preferably, the selected spectral ranges comprise a single wavelength. In other aspects, the illustrated hardware filters are not included. A sensor is configured to receive a broad spectral range of the spectrum of radiation emitted from the glass cullet and the system further comprises a processing module configured to select one or more narrower spectral ranges from the broad spectral range received by the sensor. The processing module can use one of the following types of electronic filters to select the one or more narrower spectral ranges: a hardware filter, a software filter, and a combination hardware/software filter.

As the cullet 97 travels through the sensing region 130' it encounters the selected spectral ranges of radiation, which irradiate the cullet. Preferably, the spectral ranges are selected so that exposure of the cullet 97 to the radiation within the sensing region 130' causes the cullet 97 to fluoresce and emit a characteristic spectrum of radiation. Preferably, the spectral range of the incident radiation provided by the radiation emitting module 102' causes the spectrum of radiation to differ depending on the type of material the cullet 97 comprises. In an exemplary aspect, when exposed to UV radiation with wavelengths in the range of 350 nm to 410 nm, a borosilicate cullet fluoresces differently than a soda-lime cullet. Preferably, the radiation emitting module in an apparatus according to the present invention emits UV radiation with 373 nm wavelength. Of course, other wavelength ranges are contemplated within the present invention.

The filter 103' determines spectral ranges of radiation incident on the sensor module 104'. The spectrum of radiation incident on the filter 103' includes both the spectrum of radiation emitted via fluorescence from the cullet 97 as it passes through the sensing region 130' as well as radiation reflected and deflected from the cullet 97 and other surfaces with in the sensing apparatus 20. Preferably, the filter 103' only permits spectral ranges in which significant differences exist in the fluorescent spectra of the possible materials composing the cullet 97. In addition, the spectral ranges selected by the filter 103' preferably exclude the majority of reflected and deflected radiation within the sensing apparatus 20, i.e. they include only radiation fluoresced from the cullet 97. Of course other design concerns dictate these ranges to some extent, e.g. the selection of materials used to construct the sensing apparatus, and other portions of the sorting system. Following sensing of the selected spectral ranges, the control module 120' uses data from the sensor module 104' to determine the type of the passing cullet 97.

In various embodiments of the present invention, many different specific devices and configurations of devices are used as the sensor module 104' and the filter 103'. For example, the sensor module 104' and the filter 103' can be integrated into a single device. Alternatively they can be separately provided, as shown. In an exemplary embodiment, the sensor module 104' is a charge coupled device, which is exposed to radiation which has passed through the filter 103'. In an alternative embodiment, the sensor module 104' is a fluorometer. In alternative embodiments, the sensor module 104' can be another type of camera, or an appropriately configured photomultiplier tube.

In a color sensing apparatus, shown in FIG. 3A, the cullet 97 passes through a light sensing region, designated as the area between the light emitting module 132 and the sensor module 134. The light emitting module 132 is preferably a white light source which is constantly on when the system is running. The light emitting module 132 is preferably coupled to the system power source such that when the system power source is turned on, the light emitting module is turned on. Alternatively, the light emitting module 132 includes any number of light sources, such as light emitting diodes (LED), which emit any desired color or combination of colors. It is contemplated that the light emitting module is capable of emitting light continuously, sequentially and/or in regular intervals.

The preferred white light source within the light emitting module 132 uniformly emits all the frequency wavelengths in the light spectrum of interest. It is preferred that the white light source within the light emitting module 132 is a white LED source which emits light at a number of frequencies, and which is positioned beneath the roller 140, as shown in FIG. 3A. Alternatively, the light source 132 is placed elsewhere with respect to the conveyer belt 138 and positioned to substantially face the sensor module 134. In an alternative embodiment, the white light source within the light emitting module 132 is a tubular bulb gas discharge lamp. The light emitted by the light source within the light emitting module 132 is attenuated through the cullet 97, and the light transmitted through the cullet 97 is sensed by the sensor module or light sensor 134. In the case of an opaque contaminant, the absence of light blocked by the contaminant is sensed by the sensor module or light sensor 134.

In both the color sensing apparatus and the type sensing apparatus, a characteristic of the passing cullet 97 is identified (to within a selected probability), the control module 142 or 120' activates the actuator 136 or 106' to deflect the cullet 97 into a desired trajectory path 150 (into bin number 2 of FIG. 2C). Alternatively, the control module 142 or 120' does not activate the actuator 136 or 106', whereby the cullet 97 merely continues along the initial trajectory path 152 (into bin number 1 of FIG. 2C).

The actuator 136, as shown in FIG. 3A, of the present invention is preferably a fluid driving device. A fluid driving actuator 136 operates at a substantially faster rate than typical air jets and does not suffer from material compressibility issues which exist with air actuators. A fluid driving actuator 136 preferably projects a substantially incompressible fluid toward the cullet 97 as the cullet falls along the path through the actuating zone. Preferably, the actuator 136 directs recycled water at the cullet 97, although other fluids are alternatively contemplated. Piezoelectric valves are preferably utilized within the fluid driving actuator 136 to control the speed and volume of the liquid directed at the cullet 97 at a particular time. In one embodiment, the piezoelectric valves within the actuator 136 allow an amount of fluid equal to a few picoliters to be discharged from the actuator 136. The preferred actuator 136 therefore is configured to propel small cullet particles in a selective and accurate manner.

Figure 3B:
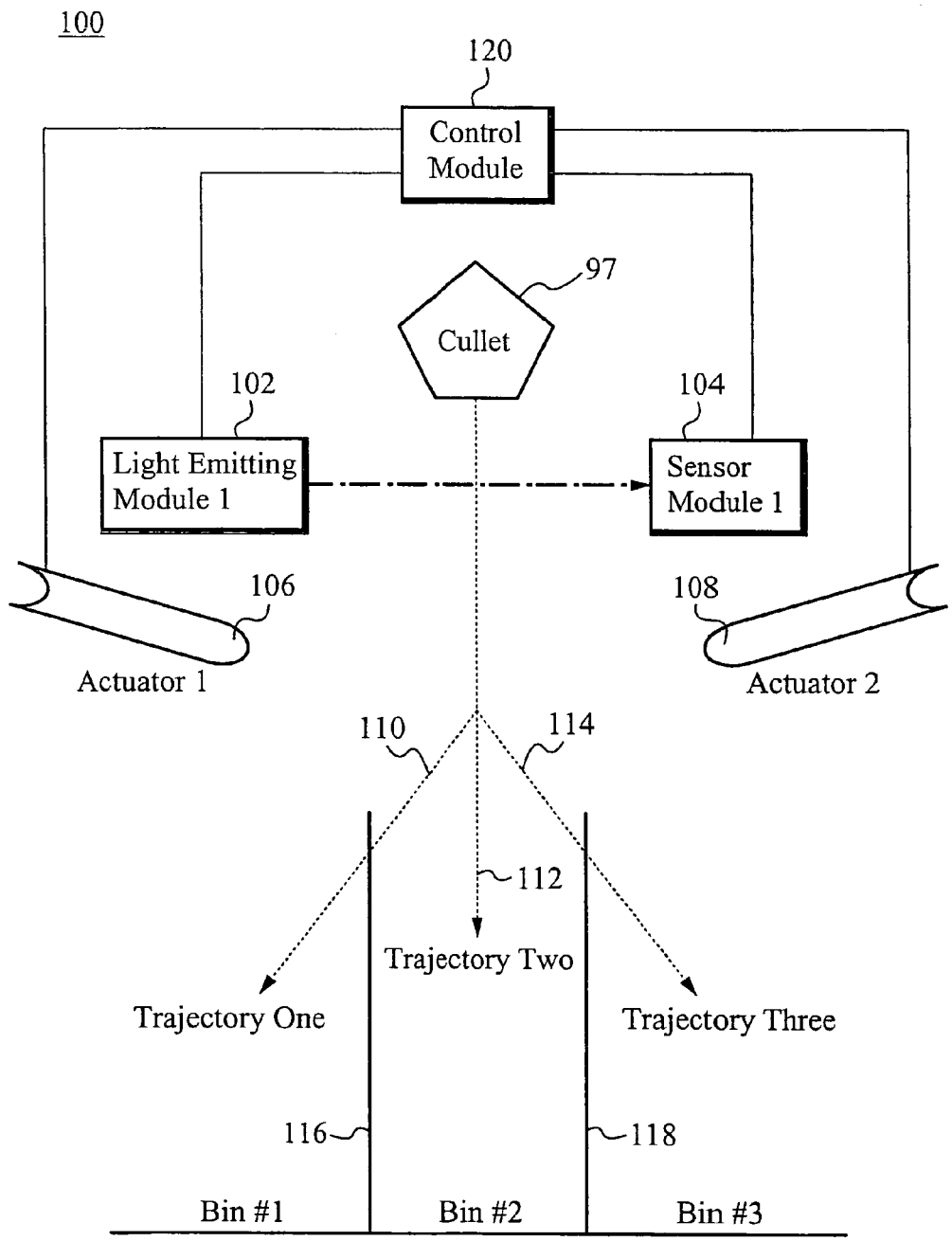
FIG. 3B illustrates a schematic of another alternative embodiment of the sorting mechanism in accordance with the present invention.
Figure 3C:
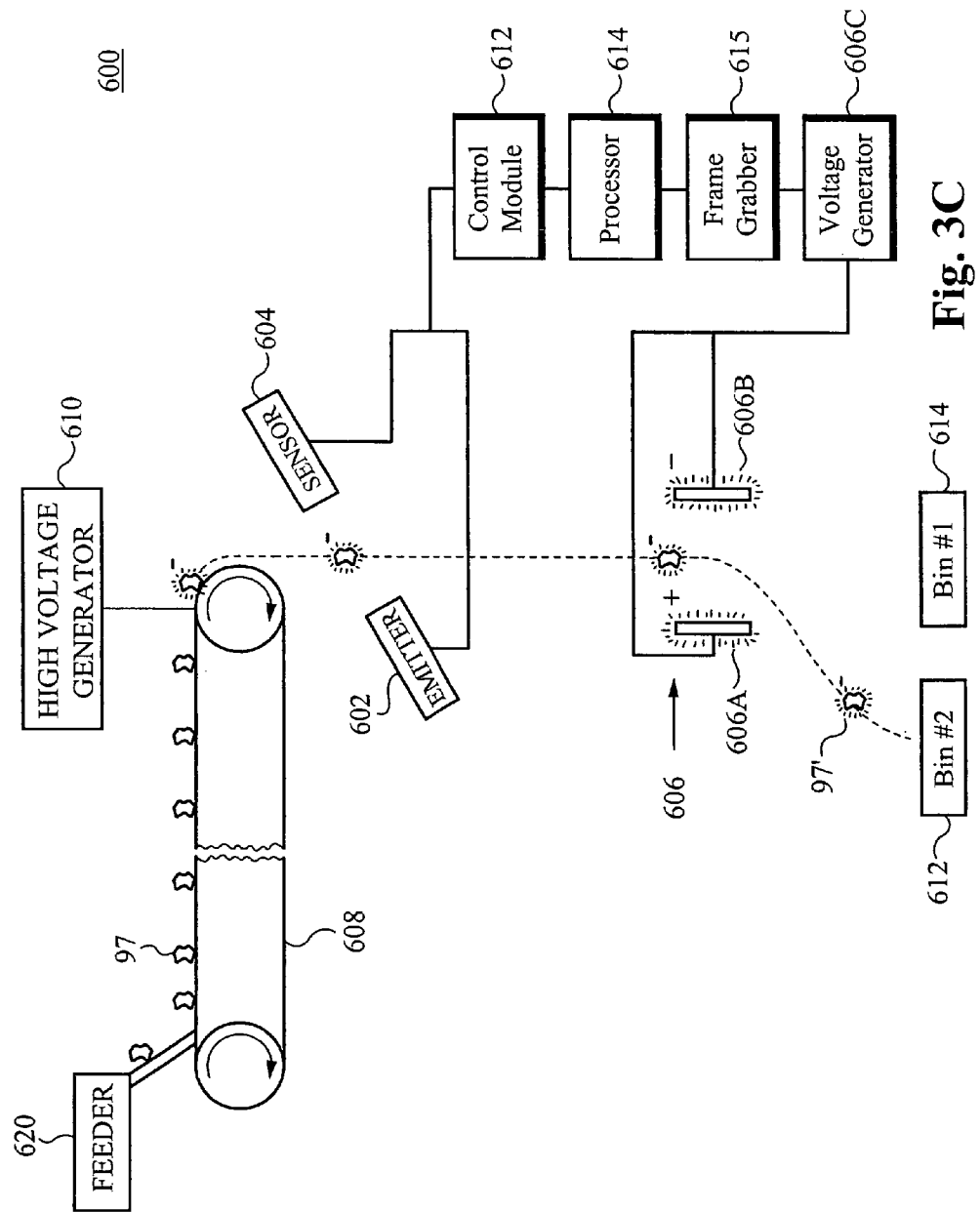
FIG. 3C illustrates a schematic of an actuating device for use in the sorting mechanism in accordance with the present invention.

As shown in FIG. 3C, the actuator 606 of the present invention is alternatively an electrostatic device, whereby the electrostatic actuator 606 operates at a substantially faster rate than typical air jets. Similar to a fluid driving actuator, the electrostatic actuator does not suffer from compressibility issues in air driven actuators. The electrostatic actuating device 606 utilizes electrostatically charged cullet 97 having a desired polarity, whereby the actuating device 606 either generates a same or opposite polarity to influence the cullet 97 to fall along a desired trajectory. The system 600 charges the cullet 97 by applying a high voltage to the cullet 97. In one embodiment, a high voltage generator component 610 electrically charges the cullet 97 along the conveyer belt 608. In another embodiment, the cullet 97 are charged along the conveyer belt 608. The details of how cullet are polarized or charged are well known in the art and are not discussed herein.

As shown in FIG. 3C, the electrostatic actuating device 606 preferably includes pairs of metal plates 606A, 606B separated by a distance and aligned parallel to one another. Preferably, the metal plates are printed on a printed circuit board and of a size approximately the size of the expected cullet to be separated. Alternatively, the two plates 606A, 606B are aligned non-parallel to one another. A power source 606C is coupled to the two plates 606A, 606B and provides a voltage to charge the plates to a desired electrical potential. The charged cullet 97' passes through the light sensing region between the emitter 602 and the sensing module 604 and then falls along the path through the actuation region between the plates 606A, 606B. The plates 606A, 606B are individually or collectively charged to attract or repel the charged cullet 97 to deflect the cullet 97. Based on the instructions provided by the processing module 614, the plates 606A, 606B are energized to a desired polarity to direct the charged cullet 97 to the appropriate bin. For example, as shown in FIG. 3C, a negatively charged cullet 97' will be attracted toward the left plate 606A, which is positively charged, and repelled by the right plate 606B, which is negatively charged. The charged cullet 97' will therefore be deflected by the charged plates 606A, 606B toward the bin 612. In the event that the processor 615 determines that the charged cullet 97 is to be directed to the bin 614, a reverse voltage is applied to the plates 606A, 606B. The plate 606A will thereby be positively charged and the plate 606B will be negatively charged. Therefore, the repelling force of the negatively charged plate 606A will aid in directing the cullet 97 to the bin 614.

The amount of deflection that the charged cullet 97 undergoes is proportionate with how highly the cullet 97 is charged and the strength of the electrical field across the plates 606A, 606B of the actuator 606. The strength of the electrical field between the plates 606A, 606B is in proportion with the amount of voltage between the plates 606A, 606B as well as the distance between the plates 606A, 606B. Alternatively, only one of the plates is charged to a desired polarity and the remaining plate is not charged. Alternatively, in a further alternative embodiment, it is also contemplated that neither plate 606A, 606B is charged, whereby the charged cullet 97 falls along the initial trajectory path to a corresponding bin (not shown).

Referring now to FIG. 3A, the operation of the light sensing apparatus included in a preferred embodiment of the present invention is discussed. The sensor module 134 preferably includes a line scan or line array camera which includes three rows of 2098 pixels each. In an alternative embodiment, the sensing module 134 is any other appropriate camera device. Each individual row of pixels in the camera 134 is preferably designated for sensing a particular color transmitted through the cullet 97. For instance, one row in the line array camera of the sensor module 134 is preferably sensitive to the intensity of red light, whereas the remaining two rows are correspondingly sensitive to the intensity of green and blue light. Alternatively, the line array camera of the sensor module 134 senses pixels of other colored light. The line array camera of the sensor module 134 preferably performs a sampling of the received light at regular intervals of 500 microseconds. Alternatively, the line array camera of the sensor module 134 performs the sampling of light at other desired timed intervals.

The line array camera of the sensor module 134 is preferably coupled to a frame grabber device 145. Alternatively, the frame grabber device 145 is incorporated within the line array camera of the sensor module 134 or the processing module 144. The frame grabber device 145 receives the output from the line array camera of the sensor module 134 in the form of analog signals which are representative of the intensity of colored light of each pixel sensed by the line array camera of the sensor module 134. The frame grabber device 145 converts the analog color intensity information into a digital representation for processing and analysis by the processing module 144. The frame grabber device 145 provides a digital value of the color intensity information which is preferably within the range of, and including, the digital values of 0 and 4095. In an alternative embodiment, the frame grabber device 145 is a digital frame grabber, whereby the digital frame grabber device 145 receives digital color intensity information directly from the line array camera within the sensor module 134 or an analog-to-digital (A/D) converter.

The processing module 144 is coupled to the frame grabber device 145 and receives the digital pixel information from the frame grabber device 145. Generally, the processing module 144 analyzes the digital pixel information and determines the color of the cullet 97 therefrom. In particular, the processing module 144 analyzes the digital pixel information to determine whether the light sensed by the sensing module 134 is white light directly from the white light source within the light emitting module 132 or colored light transmitted through the cullet 97. In addition, the processing module 144 analyzes the digital pixel information to determine whether any light at all was sensed by the sensing module 134. In the case where little or no light was sensed by the line array camera within the sensor module 134, the processing module 144 will conclude that the particular cullet 97 is opaque or has an impurity within.

The digital pixel information is analyzed by the processing module 144 to determine if the color sensed is one of the colors of interest in the sorting process. The processing module 144 utilizes an algorithm to determine the color of the analyzed glass cullet, whereby the algorithm takes into account several different factors. The preferred algorithm is shown as:

$$f(r, g, b) = k_0 + \frac{k_1 r + k_2 g + k_3 b}{r + g + b}$$

As shown in the equation above, the value r, is the digital value of the pixels in the sensing module 134 which are sensitive to the received red light. The value g, is the digital value of the pixels in the sensing module 134 which are sensitive to the received green light. In addition, the value b, is the digital value of the pixels in the sensing module 134 which are sensitive to received blue light. As stated above, the digital values of r, g, and b are preferably in the range between and include the values of 0 and 4095 and are preferably obtained from the frame grabber device 145. The denominator of this algorithm normalizes color discrimination to be independent of the total intensity (r+g+b) observed.

The preferred algorithm for detecting opaque objects is shown as:

$$f(r,g,b) = k_0 + k_1 r + k_2 g + k_3 b$$

If it is determined using this opaque algorithm that the function is less than zero, then the pixel is dark and the ejection valve should be turned on to eject the cullet from the stream. The threshold variable $k_0$ is preferably set high enough so that all the contaminants are ejected from the stream and land in the contaminant box and all the colored pieces remain within the stream of cullet to be further sorted.

The values of the variables $k_0$, $k_1$, $k_2$, and $k_3$ are determined empirically to provide the best performance of the sorting system based on the color being detected by the sensor 104'. Using the color algorithm above, when ejecting a specific color, such as for example red, from the stream of cullet, the value of r will be big and the value of b and g will be small, because a red cullet will pass red light and attenuate blue and green light. For the maximum value of the fraction with a red cullet, the value of r is set to 4000, the value of b and g is set to zero, $k_1$ is set to 1, and $k_2$ and $k_3$ are both set to zero. With these values, the fraction f is then equal to 1. If there is then a red cullet, with values of r=3000, g=300 and b=300 and the variables are set to $k_1$=1, $k_2$=0.1, and $k_3$=0.1, the fraction f is equal to 0.85. If the variables $k_1$, $k_2$, and $k_3$ are the same and a green cullet is detected with values of r=300, g=3000 and b=300, the fraction f is then equal to 0.175. When there is nothing in the optical path, the values are equal to r=4000, g=4000 and b=4000. In this situation, with the same values for the variables, the fraction f is equal to 0.4. Using this analysis, a value of the fraction f over 0.5 would verify the detection of a red cullet. The processing module is preferably set to activate the actuator 136 to eject a particular cullet when the value of the fraction f is greater than zero. Accordingly, in this situation, the value of $k_0$ is set to -0.5, so that anything over a zero will be ejected as a red cullet.

A similar analysis is applied to the detection of any other color or combination of colors. Presenting sample glass of different colors to the camera, and recording the camera measurements for known colors of glass, determine the value of the variables $k_0$, $k_1$, $k_2$, and $k_3$. The values of the variables $k_0$, $k_1$, $k_2$, and $k_3$ are then adjusted incrementally to optimize the discrimination of the system between colors. The values of the variables $k_0$, $k_1$, $k_2$, and $k_3$ are preferably different for each separation step.

Preferably, the processing module 144 maintains a circular array of storing flags which indicate whether the actuator 136 should be activated to eject a particular cullet within the light sensing region. The array is preferably as wide as the number of actuators 136. In addition, the array is preferably as long as the number of line scans which the line array camera within the sensor module 134 performs in the time that the cullet 97 falls from location of the sensing module 134 to the location of the actuator 136. After each camera line scan, the results of the color data analysis are stored in the line of an eject flag array at the location of the input pointer to the array. The input pointer is then moved to the next location along the entire scan line. After each camera line scan, the output pointer to the array is moved to the next line. If any eject flags are present in the corresponding scanned array line, a signal is sent to the actuator 136, and the corresponding actuator 136 is activated.

A type sorting apparatus in accordance with the present invention irradiates an object with selected spectral ranges of radiation and uses characteristics of fluoresced radiation emitted from the object to determine a path for the object. As described above, during operation of a type sorting apparatus, a radiation emitting module, e.g. 102' of FIG. 2C, irradiates an object, causing it to fluoresce and emit a spectrum of radiation. The excitatory radiation emitted from the radiation emitting module in FIGS. 2A-2C is shown as a straight dashed line, while emission of fluorescent radiation by the objects is illustrated in FIGS. 2A-2C as a wavy dashed line to signify that the fluoresced radiation may be of different character than the excitatory radiation. Of course, in exciting resonantly fluorescent materials, the excitatory and fluoresced radiation are of the same wavelength. This emitted radiation is preferably used to characterize the object. Though several configurations of the emitter and sensor are considered, e.g. the angled configuration of FIG. 2C, the linear configuration of FIG. 3C, in each case the sensor is configured to receive only selected spectral ranges of radiation.

Also, the various configurations of the emitter and sensor can be arranged to detect different types of fluorescence. An apparatus with a linear configuration as in FIG. 3C can be configured to detect primarily transmitted fluorescence, that is fluoresced radiation emitted from the side of the object distal from the sensor or from the side of the object proximal to the sensor from excitatory radiation that has passed through the object. An apparatus with an angled configuration as in FIG. 2C can be configured to detect primarily surface fluorescence, radiation fluoresced from the surface of the object exposed to the excitatory radiation. Further, it should be noted that an emitter and sensor can be placed in a variety of configurations, these configurations include variations in both the angle between the emitter and sensor and the angle between the emitter-sensor plane and the object trajectory. By altering the configuration of the emitter and detector, objects exhibiting both isotropic and anisotropic fluorescence can be processed. Thus, in objects opaque to the fluoresced radiation in one or more directions the sensor can be configured along a non-opaque direction. In an additional aspect, the present invention contemplates including multiple radiation emitting modules to excite the object from a variety of angles. Further, multiple sensors can be included and their signals combined to form a single signal.

The sensor module, e.g. 104' of FIG. 2C, receives radiation in the selected spectral ranges and translates it into one or more signals. Preferably, these signals correspond to intensities within the selected spectral ranges. These signals are provided to the control module, e.g. 120', which processes the signals and makes a determination as to what type of material the object comprises. The determination relies on comparison between the received signals and stored values corresponding to signals characteristic of possible types.

Figure 6:
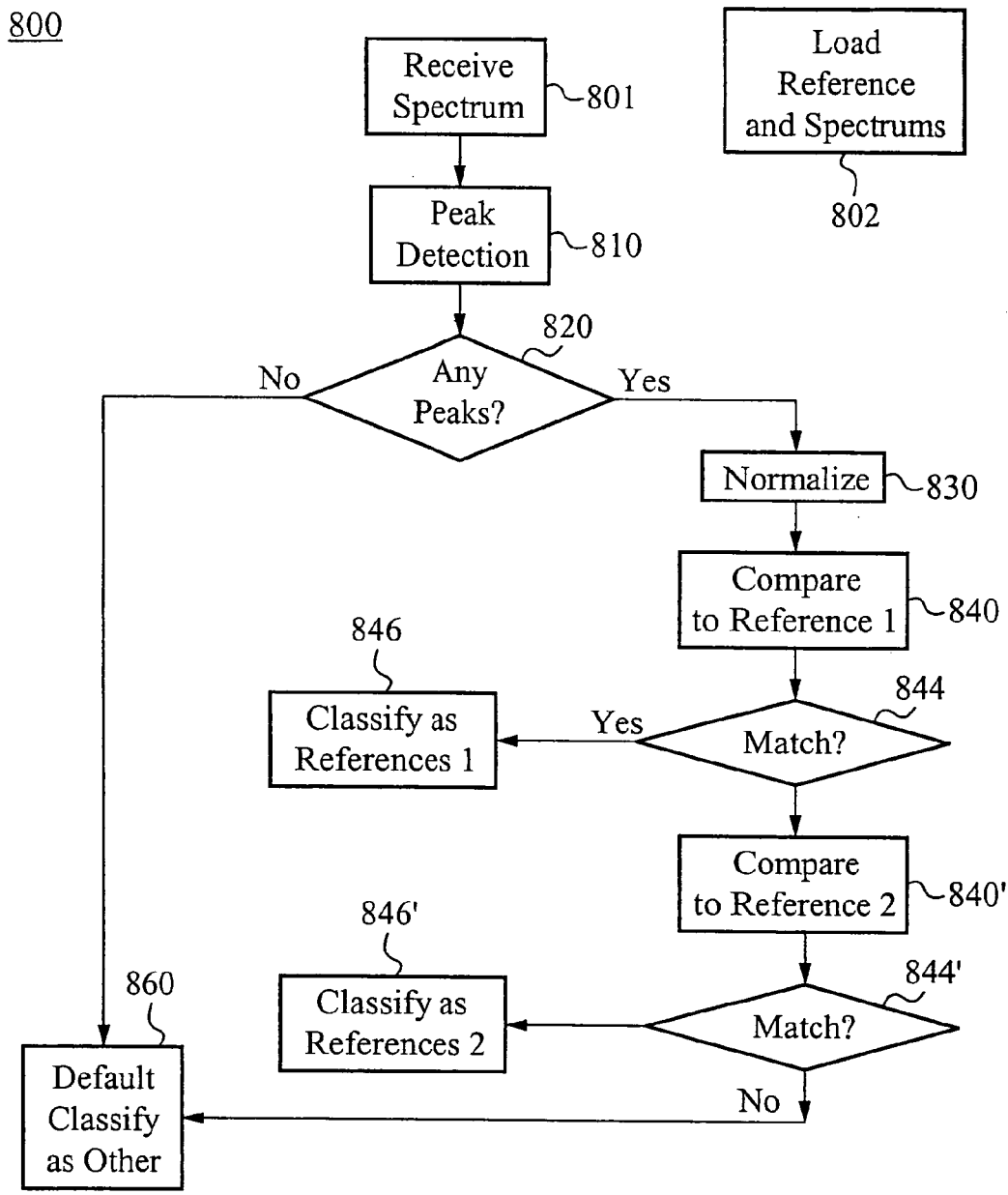
FIG. 6 is a flow chart illustrating a logic tree for sorting glass consistent with the present invention.

In an exemplary process, shown in FIG. 6, a series of factual determinations performed on the signals provided by the sensor from an object's fluoresced spectrum result in a classification of the object as either a first type or a second type. Of course, similar processes can be developed for greater numbers of types, though with a large number of possible types a more-parallel algorithm would be desirable. This exemplary process could be performed in the control module 120' responsive to signals from the sensor module 104'. At some point, asynchronously and preferably at the initiation of a higher level system controller, the control module 120' loads reference data corresponding to the spectra of possible object types (in this case first type data and second type data) into memory for comparison with acquired data. The type sorting process 800 is initiated when data corresponding to the fluoresced radiation spectrum of an unknown object is received at step 801. Preferably, the data is in a sparse and easily manipulable array format. The process then performs a peak detection algorithm on the data, in step 810, which may be any known peak detection algorithm, e.g. threshold peak detection or Gaussian peak detection. At step 820, if peaks are detected, they are measured and translated into a peak file in a data format preferably corresponding to the format of the reference data. A normalization operation 830 scales the peak file to correspond with the scale of the reference data, or alternatively scales the reference data to correspond with the peak file. During a first comparison operation 840, the first type reference data and the peak data are compared. If a match occurs according to selected criteria (step 844) the object is classified as first type. During a second comparison operation 840', the second type reference data and the peak data are compared and if a match occurs (step 844') then the object is classified as second type. If no match occurs in 844' or no peaks are detected in 820, then the object is classified as a default (other) object.

In an exemplary application of the process 800, glass is classified as soda-lime, borosilicate, or other based on fluorescent spectra resulting from irradiation with UV radiation. In this exemplary aspect, the determination relies on multi-dimensional data corresponding to variations in intensity along a selected spectral range. In an alternative aspect, the determination relies on one-dimensional data, so the spectrum received corresponds to only a single intensity signal. The spectral location of the intensity signals are chosen to maximize the process's ability to distinguish between the three types of glass. The reference data is two sets of values, one corresponding to soda-lime glass, and another corresponding to borosilicate glass. Peak detection is used to translate the variations in intensity into a multi-dimensional array of normalized values, each corresponding to a value in a reference set. The reference and normalized values are then compared.

In contrast, when only one-dimensional data is used, peak detection is unnecessary: the process translates the value of the received intensity directly into peak data, which is normalized and compared with the data. When one-dimensional data is used, the process signals a match for soda-lime if the normalized intensity equals the reference intensity for soda-lime glass, within predetermined statistical error. Similarly, a match for borosilicate corresponds to a normalized intensity signal equaling the reference intensity for borosilicate within predetermined statistical error.

Preferably, a process in accordance with the present invention irradiates objects at 373 nm wavelength and derives intensity data from fluoresced radiation between 450 nm and 460 nm wavelengths. Of course, a process in accordance with the present invention can derive intensity data from fluoresced radiation in other spectral ranges as well. In an alternative aspect, such a process can irradiate object with radiation of wavelength between 350 nm and 410 nm. Of course, other wavelength ranges are contemplated within the present invention.

Figure 11B:
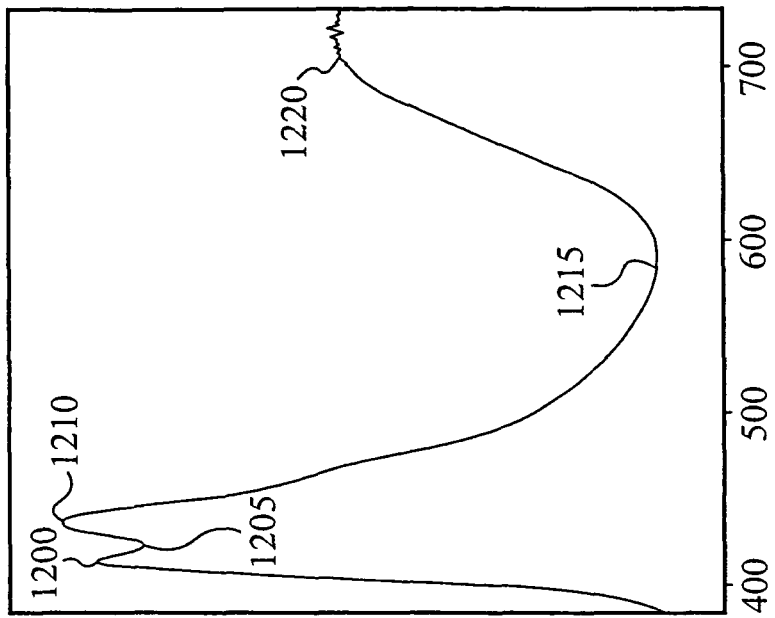
FIG. 11B is a graph of an emission spectrum for soda-lime glass at excitation wavelength of 373 nm.
Figure 11A:
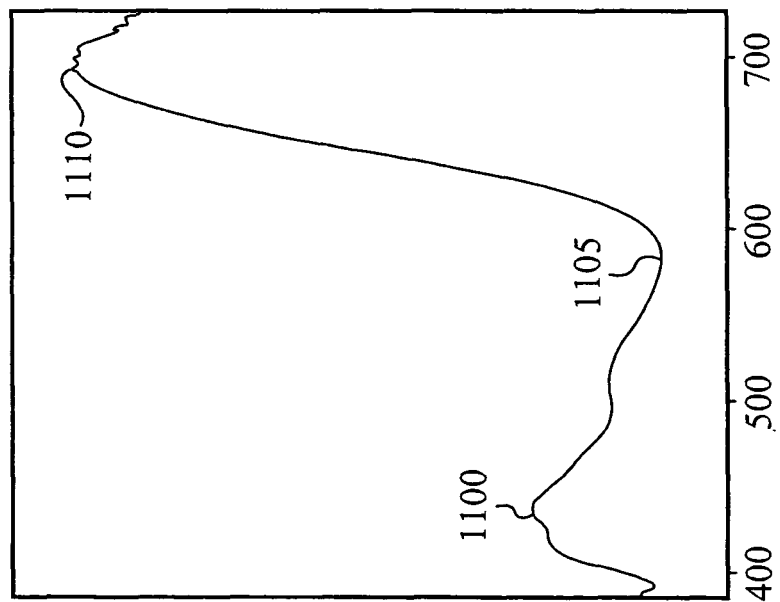
FIG. 11A is a graph of an emission spectrum for borosilicate glass at excitation wavelength of 373 nm.

The emission spectra shown in FIGS. 11A and 11B illustrate the difference in fluorescent intensity between borosilicate glass and soda-lime glass in the preferred spectral ranges. FIG. 11A shows an exemplary emission spectrum of borosilicate glass, charting excitation wavelength in nanometers on the horizontal axis against intensity on the vertical axis. The spectrum comprises a rather low mass 1100 at between 400 and 500 nm, a slight depression 1105 centered around 600 nm and a towering peak at around 700 nm. In contrast, the exemplary emission spectrum of soda-lime glass, also charting excitation wavelength in nanometers on the horizontal axis against intensity on the vertical axis, appears quite different. The soda-lime spectrum includes a tall double peak 1200, 1210 and a slight depression between 400 and 500 nm, a depression 1215 centered around 600 nm, and a smaller peak 1220 at around 700 nm. As shown, the spectra of borosilicate glass and soda-lime glass differ most under excitation at 373 nm in the spectral range between 400 and 500 nm. Accordingly, in an exemplary embodiment of the present invention a process excites glass with 373 nm radiation and derives intensity data from fluoresced spectra in the wavelength range 450 to 460 nm to differentiate between soda-lime glass and borosilicate glass.

Figure 4:
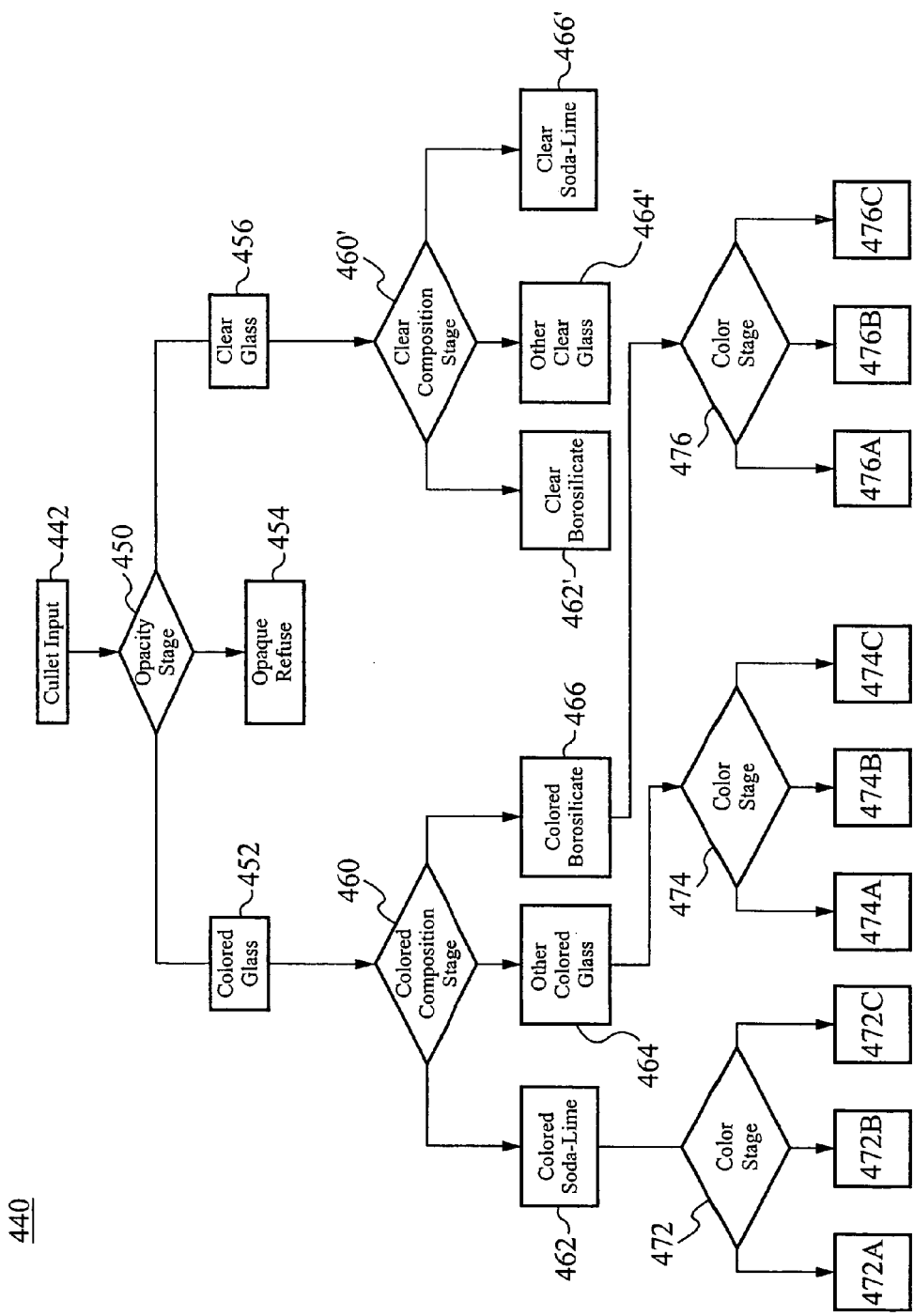
FIG. 4 is a flow chart illustrating the separation of glass according to the preferred embodiment of the present invention.

Referring now to FIG. 4, the sorting system 440 includes an opacity stage 450, two composition stages 460, 460' and three color stages 472, 474, 476. During the opacity stage 450, a stream of cullet input at 442 travels through a color sensing apparatus, or system comprising several such apparatus, as described above. Preferably, the opacity stage 450 determines opacity within a tri-sorter as described above and later with reference to FIGS. 3B and 7. The opacity stage 450 divides the cullet into three streams. Opaque cullet goes into the opaque refuse stream 454, clear cullet into the clear stream 456, and colored cullet into the colored stream 452. Preferably the opaque stream 454 is disposed of in a bin or container.

The colored glass stream 452 is routed into a composition stage 460 which splits the colored cullet into three additional streams based on the surmised content of the cullet. The determination of content in this exemplary system is limited to soda-lime glass, borosilicate glass, and other glass. The content stage 460 preferably determines the content of a particular piece of glass based on its fluorescent spectrum as described earlier. The content stage 460 supplies three output streams: colored soda-lime 462, colored borosilicate 466, and other colored glass 464, each of which is optionally sorted by color.

In the optional soda-lime color stage 472, the soda-lime output stream 462 is divided into the color streams 472A, 472B, and 472C based on color. Preferably, the color determinations are performed using color sorting apparatus as described above.

In the optional borosilicate color stage 476, the borosilicate output stream 466 is divided into the color streams 476A, 476B, and 476C based on color. Preferably, the color determinations are performed using color sorting apparatus as described above.

In the optional other color stage 474, the other output stream 464 is divided into the color streams 474A, 474B, and 474C based on color. Preferably, the color determinations are performed using color sorting apparatus as described above.

The clear glass stream 456 is routed into the clear composition stage 460', where it is divided into three streams according to glass type. In this example, the composition stage 460' divides the glass into borosilicate 462', soda-lime 466', and other glass 464'. Preferably this division is accomplished as set forth above with reference to FIG. 2A or 2B.

Thus, the sorting system 440 takes one stream of cullet input 442, and divides it into a plurality of cullet streams, each containing cullet grouped by type and/or color.

Figure 5:
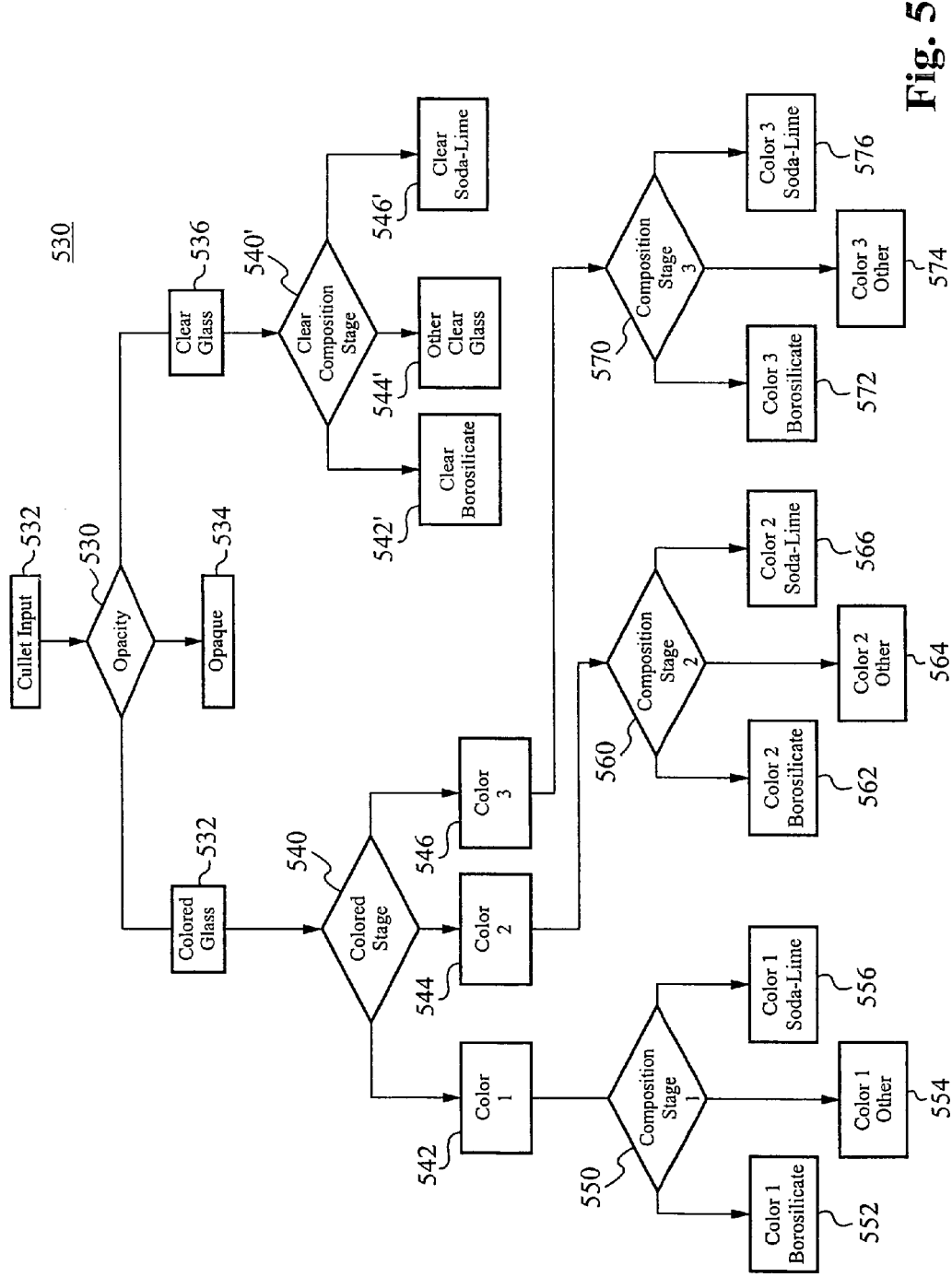
FIG. 5 is a flow chart illustrating the separation of glass according to an alternative embodiment of the present invention.

The sorting system 530 illustrated in FIG. 5 includes similar steps, but in a different order. In this case, the color sorting stage 540 occurs prior to the composition stages 560, 550 and 570. The cullet input 532 is sorted into opaque 534, colored glass 532 and clear glass 536 streams. The clear glass stream 536 is sorted by composition in the stage 540' into the clear borosilicate stream 542', the other clear glass stream 544', and the clear soda-lime stream 546'.

However, the colored glass stream 532 travels to the color sorting stage 540, divided into a first color stream 542, a second color stream 544, and a third color stream 546. The several color streams are each supplied to a separate composition stage. The first color stream 542 moves into the composition stage 550 and is divided into first color borosilicate, first color soda-lime and first color other glass. The second color stream 544 moves into the composition stage 560 and is divided into second color borosilicate, second color soda-lime and second color other glass. The third color stream 546 moves into the composition stage 570 and is divided into third color borosilicate, third color soda-lime and third color other glass. Thus the system 530 also accomplishes the task of dividing a cullet stream into several cullet streams separated according to glass type and/or glass color.

Preferably, the systems in accordance with the present invention are adapted to deliver the plurality of glass streams into selected, corresponding containers.

In FIGS. 7, 8, 9 and 10, extended portions of a glass sorting system and/or method consistent with the present invention are illustrated. These portions include only arrangements of sorting apparatus configured to sort cullet according to color. According to the present invention, a glass sorting system includes both color sorting and type sorting stages. Thus, the portions illustrated in FIGS. 7, 8, 9, and 10 can each comprise a portion of a system and/or method also including a type sorting stage, according to the present invention.

Figure 7:
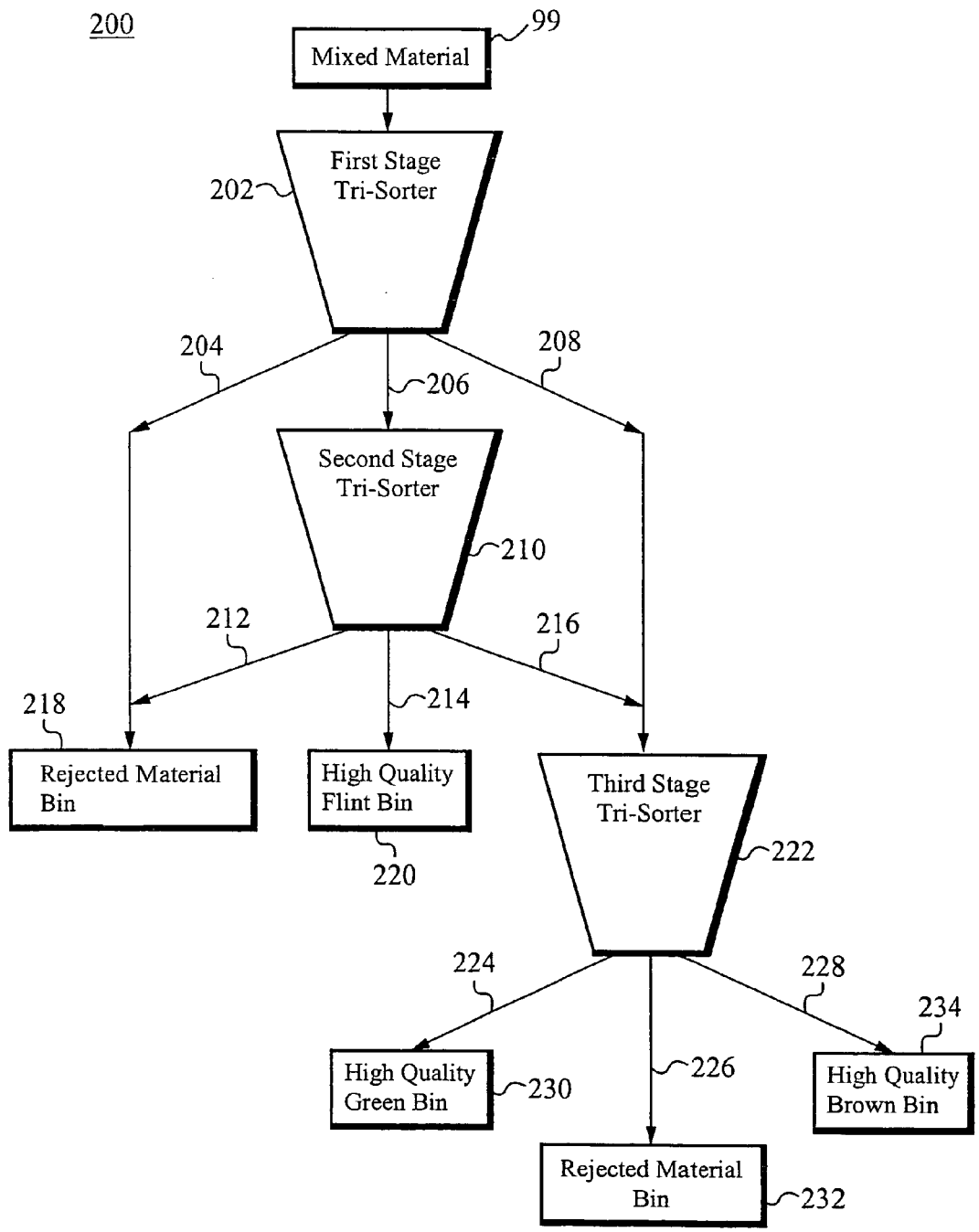
FIG. 7 illustrates a three stage glass sorting system with tri-sorter mechanism in accordance with the present invention.

FIG. 7 illustrates a three stage glass sorting system 200 with multiple tri-sorter mechanisms in accordance with the present invention. It should be noted that the description regarding the color identification techniques and actuators described above in relation to FIGS. 3A-3C is applicable to the sorting apparatus in FIGS. 2 and 3. As shown in FIG. 7, the sorting system 200 includes a first stage tri-sorter 202 coupled to a second stage tri-sorter 210. The first stage tri-sorter 202 and the second stage tri-sorter 210 are coupled to a rejected material bin 218 and a third stage tri-sorter 222. In addition, the second stage tri-sorter 210 is coupled to a high quality flint bin 220. The third stage tri-sorter 222 is coupled to a high quality green cullet bin 230, a poor quality flint bin 232 and a high quality brown cullet bin 234.

Figure 9:
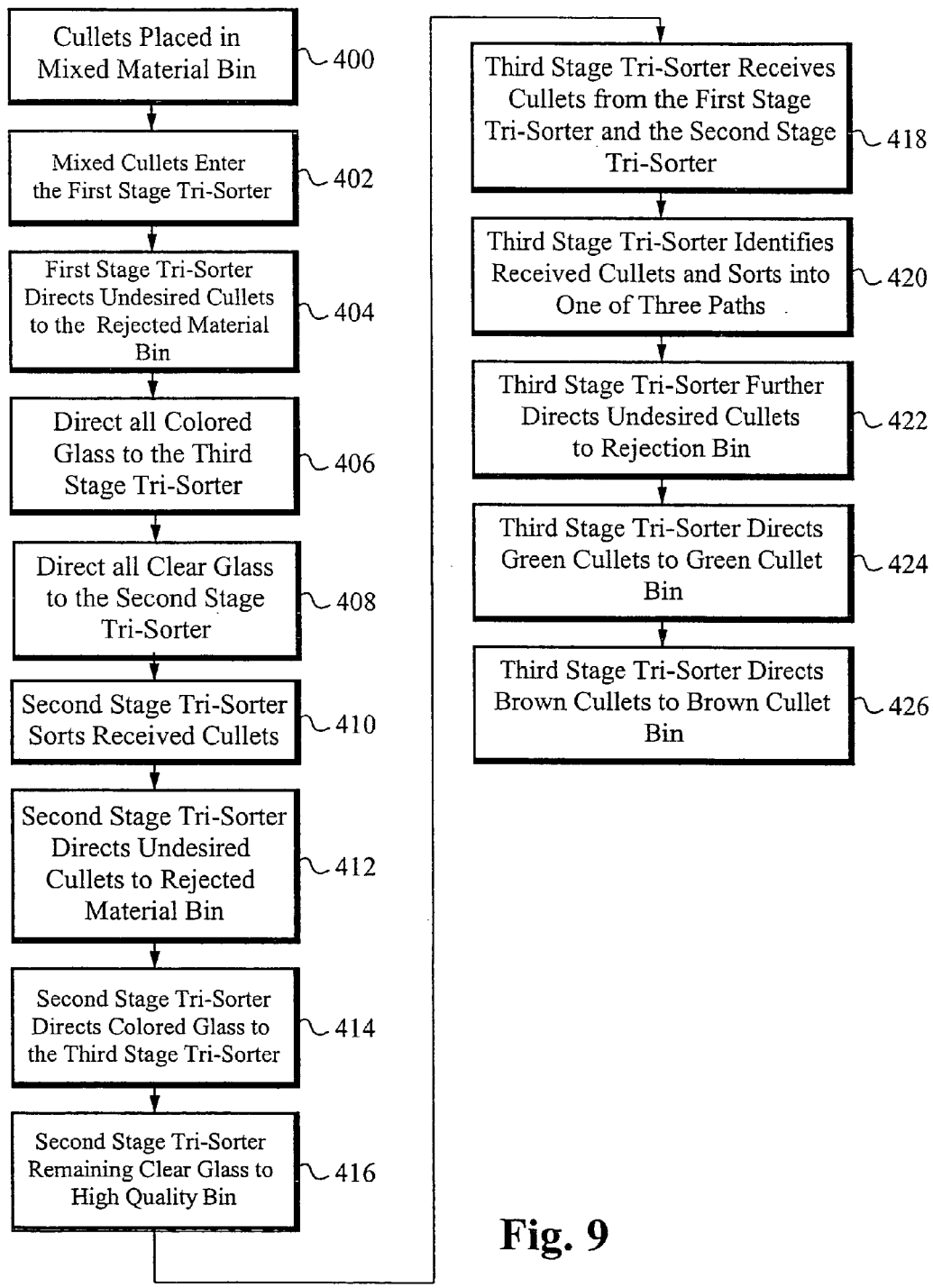
FIG. 9 illustrates a flow chart of the sorting method in the three stage glass sorting system of the present invention.

The operation of the three stage sorting system 200 of the present invention will now be discussed in conjunction with the flow chart illustrated in FIG. 9. In particular, crushed glass is placed in the mixed material bin 99 at the step 400. It should be noted that the objects in the mixed material bin 99 preferably undergo preprocessing procedures discussed above before being placed in the mixed material bin 99. The cullet are transported via a transporting mechanism, such as a conveyer belt, from the mixed material bin 99 and fed into the first stage tri-sorter 202 at the step 402. The transport mechanism used to deliver the cullet to the mixed material bin 99 can be any appropriate conventional type used or known in the art and is not discussed in detail herein. The tri-sorters discussed in each of the embodiments hereinafter preferably include the exit roller (FIG. 3A) discussed above to minimize sensing path problems.

The first stage tri-sorter 202 operates in the manner discussed above and deflects the cullet into one of three deflection or trajectory paths, 204, 206, 208. Using the preferred identification process discussed above, the first stage tri-sorter 202 deflects all the cullet identified as having undesirable characteristics into the deflection path 204. The undesired materials are thus deflected and fall into the rejected material bin 218 at the step 404. Such undesirable characteristics or materials include, but are not limited to, opaque materials, ceramics, and glass with labels. It is apparent to one skilled in the art that any other materials can be identified as undesirable.

The first stage tri-sorter 202 also deflects all cullet identified as having green characteristics as well as cullet identified as having brown characteristics into deflection path 208 from the mixed input at the step 406. Therefore, all the green and brown glass is deflected and directed via a conventional transport mechanism to the third stage tri-sorter 222 for further processing, as discussed below. The first stage tri-sorter 202 also directs all cullet identified as having clear characteristics to path 206, whereby the clear or flint glass is directed to the second stage tri-sorter 210, at the step 408, via a conventional transport mechanism. Preferably, the clear or flint glass is allowed to fall undeflected, whereby no actuation is applied to the flint glass by the first stage tri-sorter 202. Alternatively, instead of allowing the cullet to fall undeflected, the identified clear glass is actuated and is deflected in a desired angled trajectory such as paths 204 or 208.

The second stage tri-sorter 210 receives the cullet fed into the path 206 from the first stage tri-sorter 202 at the step 410. In the present example, the majority of cullet fed into the second stage tri-sorter 210 have clear characteristics due to the operation performed by the first stage tri-sorter 202. Upon receiving the cullet from path 206, the second stage tri-sorter 210 identifies the received sorted cullet and further sorts and directs the identified cullet into one of the three trajectory paths, 212, 214, 216. Using the preferred identification process discussed above, the second stage tri-sorter 210 deflects all cullet identified as having undesirable characteristics into the deflection path 212. The undesired materials are deflected and fall into the rejected material bin 218 at the step 412. Such undesirable characteristics or materials are mentioned above and any materials can be programmed to be identified as undesirable.

The second stage tri-sorter 210 also deflects all cullet identified as having green characteristics as well as cullet identified as having brown characteristics into the deflection path 216 at the step 414. Therefore, all green and brown glass cullet are deflected from the second stage tri-sorter 210 and directed to the third stage tri-sorter 222 via a conventional transport mechanism for further processing, as discussed below. The second stage tri-sorter 210 also directs all cullet identified as having clear characteristics to path 214, whereby the clear flint glass is directed to the high quality flint bin 220 at the step 416. Preferably, the flint cullet are allowed to fall undeflected, whereby no actuation is applied to the flint cullet by the second stage tri-sorter 210. Alternatively, the identified clear flint cullet are actuated and are deflected in a desired trajectory, such as the paths 212 or 216. Therefore, the second stage tri-sorter 210 further sorts the cullet identified and sorted by the first stage tri-sorter 202. In this example, the second stage tri-sorter 210 sorts the remaining clear flint cullet out from the mixed material cullet into bin 220. It should be noted that although the clear flint cullet are separated out completely by the second stage tri-sorter 210, it is apparent that any other desired glass can be completely sorted by the second stage tri-sorter, instead of clear flint cullet.

The third or final stage tri-sorter 222 shown in FIG. 7 receives the cullet directed along the path 208 from the first stage tri-sorter 202 at the step 418. In addition, the third stage tri-sorter 222 receives the cullet directed along the path 216 from the second stage tri-sorter 210 at the step 418. Preferably, the cullet received by the third stage tri-sorter 222 along the paths 208 and 216 are mixed green and brown cullet. In the present example, the majority of cullet fed into the third stage tri-sorter 222 have green and/or brown characteristics due to the operation performed by the first and second stage tri-sorters 202, 210. However, the third stage tri-sorter may receive any other output feed of cullet from the first and/or second stage tri-sorter 202, 210. Upon receiving the mixed cullet from the paths 208 and 216, the third stage tri-sorter 222 identifies the received cullet and sorts the identified cullet into one of the three trajectory paths, 224, 226 and 228 at the step 420. Using the identification process discussed above, the third stage tri-sorter 222 deflects all cullet identified as having undesirable characteristics into the path 226, whereby the undesired cullet are directed to the rejection bin 232 at the step 422. Such undesirable characteristics or materials are mentioned above and any of the received materials can be programmed into the third stage tri-sorter to be identified and sorted as undesirable.

The third stage tri-sorter 222 also identifies and sorts all cullet identified as having green characteristics into the deflection path 224, whereby the deflected green cullet are sent to the high quality green cullet bin 230 at the step 424. The third stage tri-sorter identifies and deflects all cullet identified as having brown characteristics into the deflection path 228, whereby the deflected brown cullet are sent to the high quality brown cullet bin 234 at the step 426. Therefore, the third stage tri-sorter 222 further sorts the cullet already identified and sorted by the first and second stage tri-sorters 202, 210, whereby the third stage tri-sorter 222 completely filters the green and brown cullet out from the mixed material. The multi-stage system 200 of the present invention thereby provides a more thorough sorting operation than previous sorting systems. Accordingly, the system 200 of the present invention utilizes subsequent sorting devices to further sort the output from preceding sorting devices, whereby the subsequent sorting devices direct the cullet into bins to have a homogenous collection of colored cullet. This allows each tri-sorter within the multi-stage system 200 to be optimized to sort glass with particular characteristics. For example, within the multi-stage system 200 of FIG. 7, the second stage tri-sorter 210 is optimized to sort clear flint glass and the third stage tri-sorter 222 is optimized to sort green and brown glass.

Figure 8:
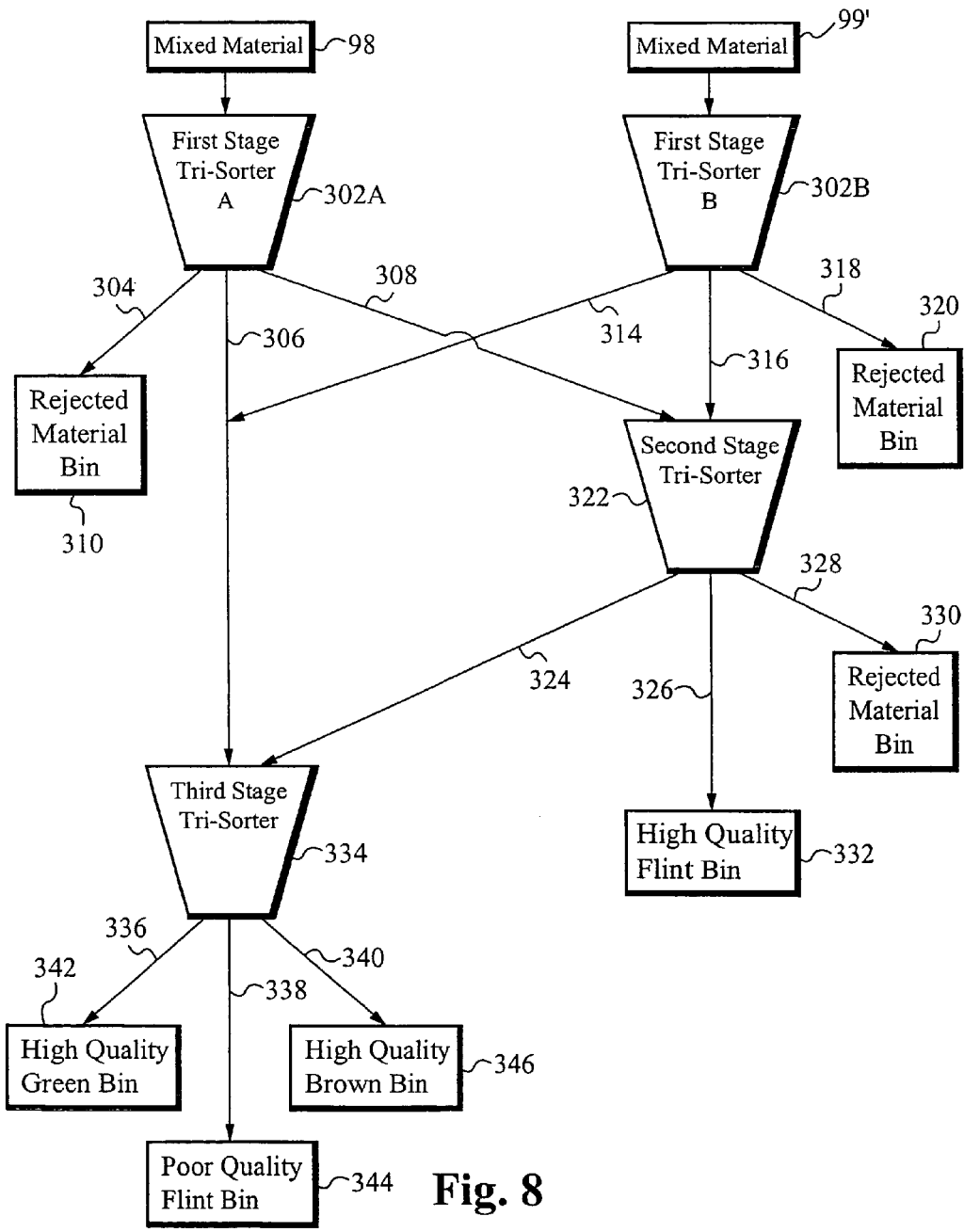
FIG. 8 illustrates a four stage glass sorting system with tri-sorter mechanism in accordance with the present invention.

FIG. 8 illustrates a four stage glass sorting system 300 with multiple tri-sorter mechanisms in accordance with the present invention. As shown in FIG. 8, the sorting system 300 includes a first stage tri-sorter A 302A and a first stage tri-sorter B 302B which preferably operate simultaneously with the other tri-sorters in the system 300. The first stage tri-sorter A 302A is coupled to a rejection bin 310, a second stage tri-sorter 322 and a third stage tri-sorter 334. The first stage tri-sorter B 302B is coupled to the third stage tri-sorter 334, the second stage tri-sorter 322 as well as a rejection bin 320. The second stage tri-sorter 322 is coupled to the third stage tri-sorter 334, a high quality flint bin 332 and a rejection bin 330. The third stage tri-sorter 334 is coupled to a high quality green cullet bin 342, a rejection or poor quality flint bin 344 and a high quality brown cullet bin 346.

Figure 10:
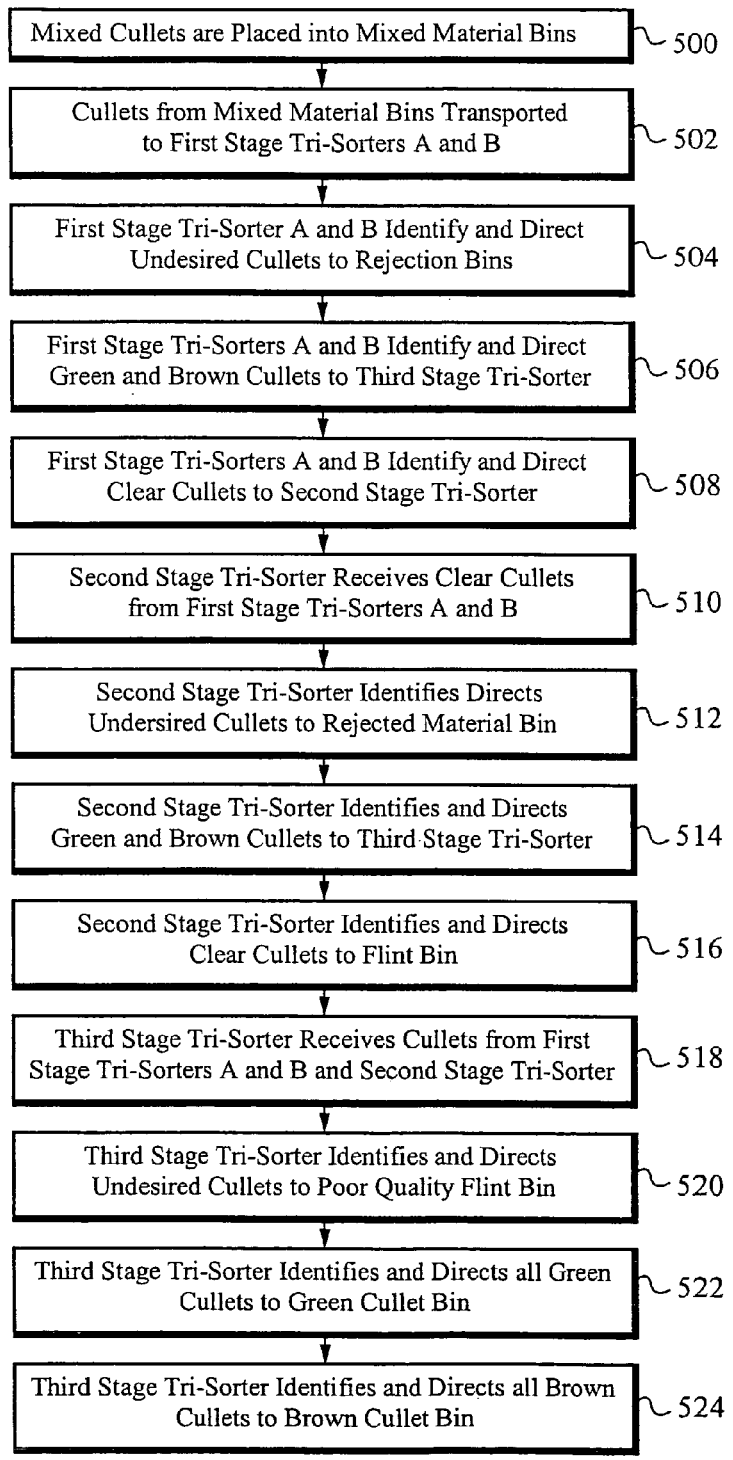
FIG. 10 illustrates a flow chart of the sorting method in the four stage glass sorting system of the present invention.

The operation of the four stage sorting system 300 of the present invention will now be discussed in conjunction with the flow chart illustrated in FIG. 10. In particular, crushed cullet or pieces, such as opaque, ceramics, glass with labels as well as colored glass, are placed in two mixed material bins 98 and 99' at the step 500. It should be noted that the cullet in the mixed material bins 98, 99' preferably undergo preprocessing procedures discussed above before being placed in the mixed material bins 98, 99'. The cullet from the mixed material bin 98 are transported via a transporting mechanism to the first stage tri-sorter A 302A at the step 502. In addition, cullet from the mixed material bin 99' are transported via a transporting mechanism to the first stage tri-sorter B 302B at the step 502. As stated above, the transport mechanism can be any appropriate conventional type used or known in the art and is not discussed in detail herein.

The first stage tri-sorter A 302A deflects the cullet into one of three deflection or trajectory paths, 304, 306, 308. Using the identification process discussed above, the first stage tri-sorter A 302A deflects all cullet identified as having undesirable characteristics to the deflection path 304 and into the rejected material bin 310 (step 504). The first stage tri-sorter A 302A directs all cullet identified as having green characteristics as well as cullet identified as having brown characteristics into the path 306, whereby the cullet in path 306 are directed to the third stage tri-sorter 334 at the step 506. Thus, all green and brown glass is directed to the third stage tri-sorter 334 via a conventional mechanism for further processing, as discussed below. Preferably, the green and brown cullet are allowed to fall along the path 306 undeflected, whereby no actuation is applied to the cullet by the first stage tri-sorter A 302A. Alternatively, instead of allowing the cullet to fall undeflected, the identified cullet are actuated by the first stage tri-sorter A 302A and are deflected in a desired trajectory such as paths 304 or 308. The first stage tri-sorter A 302A also directs all cullet identified as having clear characteristics to path 308, whereby the clear or flint glass is directed to the second stage tri-sorter 322, at the step 508 via a conventional transport mechanism.

Preferably, the first stage tri-sorter B 302B simultaneously operates along with first stage tri-sorter A 302A. The cullet to be sorted are transported via a transporting mechanism from the mixed material bin 99' to the first stage tri-sorter B 302B at the step 502. As stated above, the transport mechanism can be any appropriate conventional type used or known in the art and is not discussed in detail herein. The first stage tri-sorter B 302B deflects the cullet into one of three deflection or trajectory paths, 314, 316, 318. Using the identification process discussed above, the first stage tri-sorter B 302B deflects all cullet identified as having undesirable characteristics to the deflection path 318 and into the rejected material bin 320 at the step 504. The first stage tri-sorter B 302B directs all cullet identified as having green characteristics as well as cullet identified as having brown characteristics into the path 314 at the step 506. Thus, all sorted green and brown glass is directed from the first stage tri-sorter B 302B to the third stage tri-sorter 334 via a conventional mechanism for further processing, as discussed below. The first stage tri-sorter B 302B also directs all cullet identified as having clear characteristics to the path 316, whereby the clear or flint glass is directed to the second stage tri-sorter 322 (step 508) via a conventional transport mechanism. Preferably, the flint cullet are allowed to fall undeflected along the trajectory path 316, whereby no actuation is applied to the cullet by the first stage tri-sorter B 302B. Alternatively, instead of allowing the flint cullet to fall undeflected, the identified flint cullet are actuated by the first stage tri-sorter B 302B to a desired trajectory such as paths 314 or 318.

The second stage tri-sorter 322 receives the cullet directed along the path 308 from the first stage tri-sorter A 302A and along the path 316 from the first stage tri-sorter B 302B at the step 510. Upon receiving the cullet from the paths 308 and 316, the second stage tri-sorter 322 identifies the received cullet and further sorts and directs the identified cullet into one of three paths, 324, 326 and 328. Using the identification process discussed above, the second stage tri-sorter 322 deflects all cullet identified as having undesirable characteristics along the deflection path 328. The details of the undesirable cullet are mentioned above. The undesired materials that are deflected into the path 328 fall into the rejected material bin 330 at the step 512.

The second stage tri-sorter 322 also deflects all cullet identified as having green characteristics as well as cullet identified as having brown characteristics into the deflection path 324 at the step 514. Therefore, all green and brown glass is deflected from the second stage tri-sorter 322 to the third stage tri-sorter 334 via a conventional transport mechanism for further processing, as discussed below. In the present example, the majority of cullet fed into the second stage tri-sorter 322 have clear characteristics from the sorting operation performed by the first stage tri-sorters A and B 302A, 302B. The second stage tri-sorter 322 also directs all cullet identified as having clear characteristics to path 326, whereby the flint glass is directed to the high quality flint bin 332 at the step 516. Preferably, the flint cullet are allowed to fall undeflected along the trajectory path 326, whereby no actuation is applied to the flint cullet by the second stage tri-sorter 322. Alternatively, the identified clear glass is actuated and is deflected in a desired trajectory path such as paths 324 or 328. Thus, the second stage tri-sorter 322 further sorts the cullet already identified and sorted by the first stage tri-sorters A and B 302A, 302B, thereby completely separating the flint cullet from the mixed collection.

The third or final stage tri-sorter 334 shown in FIG. 8 receives the cullet directed along the paths 306, 314 and 324 from the first stage tri-sorters A and B 302A, 302B and second stage tri-sorter 322, respectively at the step 518. Preferably, the cullet received in the third stage tri-sorter 334 along the paths 306, 314 and 324 are mixed green and brown cullet. In the present example, the majority of cullet fed into the third stage tri-sorter 334 have green and/or brown characteristics due to the operation performed by the first stage tri-sorters A and B 302A, 302B as well as the second stage tri-sorter 322. Upon receiving the green and brown cullet directed along the paths 306, 314 and 324, the third stage tri-sorter 334 further identifies and sorts the identified cullet into one of the three paths, 336, 338 and 340. Using the identification process discussed above, the third stage tri-sorter 334 allows all cullet identified as having undesirable characteristics to fall along the path 338 at the step 520, whereby the undesired cullet are directed to the rejected bin 344. Alternatively, instead of allowing the undesired cullet to fall undeflected, the undesired cullet are actuated to a desired trajectory such as paths 336 or 340.

The third stage tri-sorter 334 also identifies and sorts all cullet identified as having green characteristics into the deflection path 336, whereby the deflected green cullet are sent to the high quality green cullet bin 342 at the step 522. In addition, the third stage tri-sorter 334 identifies and deflects all cullet identified as having brown characteristics into the deflection path 340, whereby the deflected brown cullet are sent to the high quality brown cullet bin 346 at the step 524. Therefore, the third stage tri-sorter 334 further sorts the cullet already identified and sorted by the first and second stage tri-sorters 302A, 302B and 322, thereby completely separating all the green and brown cullet into their respective bins. Accordingly, the system 300 of the present invention utilizes subsequent sorting devices to further sort the output from preceding sorting devices, whereby the subsequent sorting devices direct the cullet into bins to have a homogenous collection of colored cullet. This allows for optimization of the sorting characteristics of each tri-sorter stage within the multi-stage system 300.

The scalability of the present sorting system allows for any volume of cullet. Although the multi-sorting system described above is preferably utilized for glass cullet, it is apparent to one skilled in the art that the system is alternatively used to sort other objects. It is understood by one skilled in the art that any number of tri-sorters are utilized in the system to sort the cullet into any number of bins. In addition, the tri-sorters in the system 200, 300 may be positioned in any other configuration with respect to one another and is not limited to the configurations shown in FIGS. 2 and 3. In addition, the tri-sorters can be configured such that the cullet are deflected along a path different than those shown in FIGS. 2 and 3. Further, it is understood that the tri-sorters may be positioned such that the undesired cullet are directed into one bin instead of multiple bins. For instance, the tri-sorters can be reconfigured or repositioned such that all the undesired cullet fall into one rejection bin, such as bin 344, instead of three rejection bins 310, 320, and 344. In addition, although the steps are shown in a particular order in regards to the flowcharts in FIGS. 9 and 10, it should be noted that each tri-sorter is identifying and sorting the cullet simultaneously.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A method of preparing to effectively sort a group of objects of several types and colors into separate groups of similar type and color objects comprising:
   a. irradiating with a UV source, at least one object with one or more preselected wavelengths of radiation to cause the object to fluoresce and emit a spectrum of radiation in a type sensing region;
   b. determining at least one spectral intensity value from the spectrum of radiation;
   c. calculating a type value with a first sensor device from the spectral intensity value;
   d. transmitting at least one light with a light source through the at least one object in a color sensing region;
   e. determining at least one light intensity value from the transmitted light in the color sensing region; and
   f. calculating a color value with a second sensor device from the light intensity value.

2. The method according to claim 1 further comprising directing the at least one object to a path corresponding with the color value and the type value.

3. The method according to claim 2 wherein the path deposits the at least one object into a corresponding container.

4. The method according to claim 1 further comprising providing the at least one object to the color sensing region and subsequently to the type sensing region.

5. The method according to claim 1 further comprising providing the at least one object to the type sensing region and subsequently to the color sensing region.

6. The method according to claim 1 wherein the at least one light includes a white light source.

7. The method according to claim 1 wherein the at least one light includes one or more of a red light emitting diode, a green light emitting diode, a blue light emitting diode and an infrared light source.

8. The method according to claim 1 further comprising receiving the light transmitted through the at least one object.

9. The method according to claim 8 wherein the received light is analyzed at a desired sampling interval.

10. The method according to claim 9 further comprising converting the at least one light intensity value into a digital representation value.

11. The method according to claim 10 further comprising calculating a non-linear function from at least one digital representation value.

* * * * *